(12) United States Patent
Towler et al.

(10) Patent No.: US 6,714,276 B2
(45) Date of Patent: Mar. 30, 2004

(54) LIQUID CRYSTAL DISPLAY DEVICE

(75) Inventors: Michael John Towler, Oxford (GB);
Elizabeth Jane Acosta, Oxford (GB);
Harry Garth Walton, Oxford (GB);
Craig Tombling, Oxfordshire (GB);
Martin David Tillin, Oxfordshire (GB);
Brian Henley, Oxfordshire (GB);
Emma Jayne Walton, Oxford (GB);
Tadashi Kawamura, Nara (JP);
Akiyoshi Fujii, Nara (JP); Yuichiro Yamada, Aichi (JP)

(73) Assignee: Sharp Kabushiki Kaisha, Osaka (JP)

( * ) Notice: Subject to any disclaimer, the term of this patent is extended or adjusted under 35 U.S.C. 154(b) by 133 days.

(21) Appl. No.: 09/778,027

(22) Filed: Feb. 6, 2001

(65) Prior Publication Data
US 2001/0052961 A1 Dec. 20, 2001

(30) Foreign Application Priority Data

Feb. 8, 2000 (GB) .............................. 0002733
Oct. 9, 2000 (GB) .............................. 0024636

(51) Int. Cl.$^7$ ............................................. C09K 19/02
(52) U.S. Cl. ...................................... 349/180; 349/169
(58) Field of Search ................................ 349/167, 168, 349/169, 177, 179, 180, 181

(56) References Cited

U.S. PATENT DOCUMENTS

| | | | | |
|---|---|---|---|---|
| 4,239,345 A | * | 12/1980 | Berreman et al. | 349/179 |
| 4,264,149 A | * | 4/1981 | de Zwart et al. | 349/34 |
| 4,697,884 A | * | 10/1987 | Amstutz et al. | 349/101 |
| 4,796,980 A | * | 1/1989 | Kaneko et al. | 349/85 |
| 5,381,255 A | | 1/1995 | Ohnuma et al. | 359/68 |
| 5,864,376 A | * | 1/1999 | Takatori | 349/128 |
| 6,137,554 A | | 10/2000 | Nakamura | |
| 6,351,299 B2 | * | 2/2002 | Takiguchi et al. | 349/121 |
| 6,512,569 B1 | * | 1/2003 | Acosta et al. | 349/181 |

FOREIGN PATENT DOCUMENTS

| | | |
|---|---|---|
| EP | 10-104612 | 4/1998 |
| EP | 0 848 279 A2 | 6/1998 |
| EP | 0 996 028 | 10/1999 |
| GB | 2 343 011 A | 4/2000 |

OTHER PUBLICATIONS

International Search Report, Application No. GB 0002733.4, dated May 2, 2000.
International Search Report, Application No. GB 0024636.3, dated Jan. 8, 2001.
European Search Report regarding Application No. 01301063.2–2201.
Bos, Philip et al., "The pi–Cell: A Fast Liquid–Crystal Optical–Switching Device" 1984, vol. 113, pp. 329–339.
Noguchi et al., "P–61: The Phase Initialization in the Pi–Cell" May 13, 1997, pp. 739–742.
European Search Report regarding Application No. 01301063.2–2201.
Bos, Philip et al., "The pi–Cell: A Fast Liquid–Crystal Optical–Switching Device" 1984, vol. 113, pp. 329–339.
Noguchi et al., "P–61: The Phase Initialization in the Pi–Cell" May 13, 1997, pp. 739–742.

* cited by examiner

Primary Examiner—Robert H. Kim
Assistant Examiner—David Chung
(74) Attorney, Agent, or Firm—Renner, Otto, Boisselle & Sklar

(57) ABSTRACT

A liquid crystal display device comprises: a layer of a chiral liquid crystal material disposed between first and second substrates; and means for applying a voltage across the liquid crystal layer. A first region of the liquid crystal layer is an active region for display and a second region of the liquid crystal layer is a nucleation region for generating a desired liquid crystal state in the first region when a voltage is applied across the liquid crystal layer. The ratio of the thickness d of the liquid crystal layer to the pitch p of the liquid crystal material has a first value $(d/p)_A$ in the first region of the liquid crystal layer and has a second value $(d/p)_N$ different from the first value in the second region of the liquid crystal layer. The value $(d/p)_N$ of the ratio of the thickness d of the liquid crystal layer to the pitch p of the liquid crystal material in the second region of the liquid crystal layer is selected such that, when no voltage is applied across the liquid crystal layer, the liquid crystal state stable in the second region of the liquid crystal layer is topologically equivalent to the desired liquid crystal state.

31 Claims, 19 Drawing Sheets 1. 180° twisted LC (thin rods) doped with chiral dopant prepolymer (striped rods).
   d/p > 0.25 everywhere 2. UV exposure through photo-mask inducing polymerization of those chiral molecules diffusing into area of UV exposure.

3. Following UV exposure. Reduced concentration of chiral dopant in right-hand portion of cell results in formation of untwisted configuration.

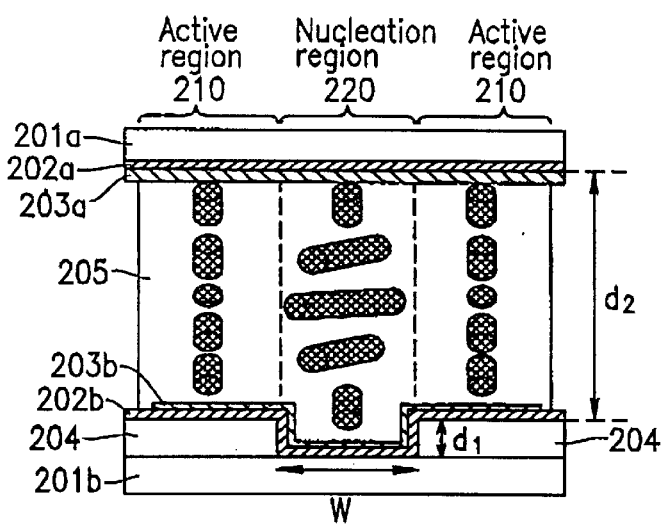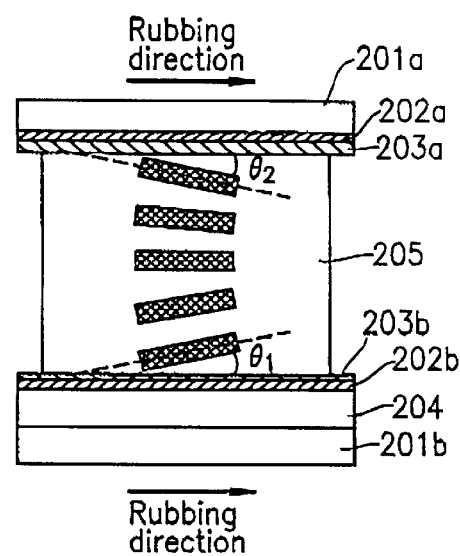

| Twist region width W(μm) | 5 | 10 | 15 | 20 | 25 | 30 | 50 |
|---|---|---|---|---|---|---|---|
| Presence of H state-180° twist state coexistence | × | ○ | ○ | ○ | ○ | ○ | ○ |

LIQUID CRYSTAL DISPLAY DEVICE

BACKGROUND OF THE INVENTION

1. Field of the Invention

The present invention relates to a liquid crystal display device, and in particular to a surface mode LCD such as a pi-cell device or a splay-bend device (SBD).

2. Description of the Related Art

The term "surface mode LCD" as used herein means an LCD in which the optical change caused by varying the electric field across the liquid crystal layer occurs primarily in layers in the vicinity of a substrate of the liquid crystal. Examples of surface mode LCDs are the pi-cell and the splay-bend device, although other types of surface mode LCDs are known. Surface mode LCDs are disclosed in "Sov. J. Quantum Electronics", 1973, Vol 3, p78–79.

The pi-cell (otherwise known as an "optically compensated birefringent device" or OCB) is described in "Mol. Cryst. Liq. Cryst.", 1984, Vol 113, p329–339, and in U.S. Pat. No. 4,635,051. The structure of a pi-cell is schematically illustrated in FIG. 1. The device comprises transparent substrates 1, 1' on which are disposed alignment layers 2, 2'. A layer of nematic liquid crystal 3 is disposed between the substrates 1, 1'.

The alignment layers 2, 2' create parallel alignment of the liquid crystal molecules in the liquid crystal layer 3 at its boundaries with the alignment layers 2, 2'. This can be achieved by using parallel-rubbed polyamide alignment layers.

Addressing electrodes (not shown) are provided on the substrates 1, 1', so that an electric field can be applied to selected areas of the liquid crystal layer. The liquid crystal layer 3 is placed between linear polarizers 4, 4', whose transmission axes are crossed with one another and are at 45° to the optic axis of the liquid crystal layer.

A retarder 5 with its optic axis perpendicular to the optic axis of the liquid crystal layer, may optionally be provided to compensate for the retardation of the liquid crystal layer. The retarder lowers the required range for the operating voltage by allowing zero retardation of the LCD to be achieved at a finite voltage across the liquid crystal layer.

FIG. 1 shows a transmissive LCD. A pi-call can also be embodied as a reflective device by providing a reflector below the liquid crystal layer, possibly by making the addressing electrode on the lower substrate a reflective electrode. The lower polarizer 4' is not required with a reflective pi-cell.

The principle of operation of the pi-cell device is illustrated in FIGS. 2A to 2D.

When no electric field is applied across the liquid crystal layer, the liquid crystal is in an H-state (homogenous state or splay state), in which the liquid crystal molecules in the center of the liquid crystal layer are substantially parallel to the substrates. This is shown in FIG. 2A. The short lines in the figures represent the director of the liquid crystal molecules.

When an electric field greater than a threshold value is applied across the liquid crystal layer, the liquid crystal molecules adopt a V-state (or a band state). In this state, the liquid crystal molecules in the center of the liquid crystal layer are substantially perpendicular to the substrates. FIG. 2C shows a first V-state which occurs at a low applied voltage across the liquid crystal layer, and FIG. 2D shows a second V-state which occurs when a higher voltage is applied across the liquid crystal layer. The pi-cell is operated by switching the liquid crystal layer between the first, low voltage V-state and the second, higher voltage V-state.

If the electric field across the liquid crystal layer should be reduced below the threshold value, the liquid crystal layer will relax to the H-state of FIG. 2A; in order to re-commence operation of the device, it is necessary to put the liquid crystal layer back into the V-state. This generally requires a large applied voltage, owing to the low pre-tilt of the liquid crystal molecules. The pre-tilt is usually below 45° and typically between 2 and 10° so as to provide sufficient optical modulation and fast switching between the two V-states (for instance of the order of a millisecond or less).

One problem with known OCB devices is the difficulty of nucleating and stabilising the V-state, which is topologically distinct from the H-state. One prior art technique is described in UK Patent Application 9521043.1/2 306 228. In this prior art technique, the V-state is nucleated under the application of a high voltage, and is stabilized by the polymerization of a network whilst a high voltage is applied. This prior art technique is, however, unsuitable for use in active matrix devices, since it is difficult to apply voltages having the required magnitude in a TFT panel. A further disadvantage is that the in-situ polymerization can lead to ionic contamination of the liquid crystal layer, and result in image sticking.

The SBD device, which is also a surface mode device, is described in UK Patent Application No. 9712378.0/2 326 245. The structure of an SBD device is generally similar to that of a pi-cell, except that the alignment layers in an SBD device have a high pre-tilt whereas the alignment layers in a pi cell have a low pre-tilt. An SBD device uses a liquid crystal material with a negative di-electric anisotropy, whereas a pi-cell uses a liquid crystal material having a positive di-electric anisotropy.

The principle of operation of an SBD is analogous to that of a pi-cell. When no voltage is applied across the liquid crystal layer of an SBD, the stable liquid crystal state is a V-state. When an electric field greater than a threshold value is applied across the liquid crystal layer, an H-state becomes stable. The SBD is operated by switching the liquid crystal between a first H-state which occurs at a low applied voltage across the liquid crystal layer and a second H-state which occurs when a higher voltage is applied across the liquid crystal layer. If the electric field across the liquid crystal layer is reduced below the threshold value, the liquid crystal Will relax into the V-state and it will be necessary to put the liquid crystal back into the H-state before operation can be re-commenced.

The high pre-tilt alignment layers required for an SBD can be produced, for example, by the photo-polymerization of a mixture of reactive mesogens.

SID 97 Digest, page 739, discloses a method of promoting nucleation of the V-state in a pi-cell. Voltages of the order of 20 V are applied across the liquid crystal layer to switch the liquid crystal from the H-state to the V-state. However, it is difficult to provide voltages of this magnitude in a TFT (thin film transistor) substrate.

Japanese published Patent Application JP-A-9 90432 (Toshiba) discloses the provision of nucleation sites within a pi-cell panel. The nucleation sites are provided by including spacer balls or pillars within the pi-cell panel, and cooling the liquid crystal material from an isotropic phase to a nematic phase while an electric field is applied across the panel. This results in some of the spacer balls/pillars acting as nucleation sites for growth of the V-state into the existing H-state. This prior art has a number of disadvantages. Firstly, it requires additional process steps during fabrication of the panel, since it is necessary to align the liquid crystal molecules under the influence of an applied electric field. These additional process steps complicate the fabrication of the panel. Secondly, some spacer balls/pillars can cause the H-state to form in the desired V-state, thus destabilising the operating state of the panel.

Miwa et al disclose, in IDW 97-Digest page 85, a method of maintaining the stability of a V-state in a pi-cell. A resetting period is provided within each frame, and the high voltage V-state is addressed in this period. This prevents the liquid crystal layer relaxing to the H-state when low driving voltages are applied. This does not, however, address the initial nucleation of the V-state from the H-state.

U.S. Pat. No. 4,566,758 discloses a surface mode nematic liquid crystal display device in which the liquid crystal layer contains a chiral dopant. When no voltage is applied across the liquid crystal layer, the liquid crystal relaxes to a twist state rather than to an H-state. The problems associated with nucleating the V-state are reduced or even eliminated, since the twist state is topologically equivalent to the V-state. However, this approach requires that the ratio of the thickness d of the liquid crystal layer to the pitch p of the twist of the liquid crystal molecules must be d/p>0.25, and such a high d/p value is known to reduce the brightness of the display. It is not possible to reduce d/p below 0.25 since, in order to obtain a 180° twist, it is necessary to bias the pitch of the liquid crystal molecules enough to favor the twist angle of 180° over a twist angle of 0°, and this requires the value of d/p to be greater than 0.25. (It is necessary for the liquid crystal to conform to the rubbing directions of the alignment films on the two substrates, so that the liquid crystal layer in a pi-cell geometry is constrained to have a twist of 0°, 180°, 360°, etc.)

Co-pending UK Patent Application No. 9822762.2 (GB 2 343 011) discloses a surface mode liquid crystal display device in which the liquid crystal layer contains nucleation regions in which the desired operating state is stabilized. These nucleation regions are obtained by providing regions of different pre-tilt angle on at least one of the substrates Such a device has the disadvantage that additional processing steps are required in order to provide the regions of different pre-tilt angle that produce the nucleation regions.

As is well known in the field of liquid crystals, the H- and V-states of a pi-cell have the property that they are topologically in-equivalent i.e. application of voltage to a pi-cell in the H-state cannot produce a smooth and continuous transformation of the pi-cell into a V-state (and vice versa). Instead the transformation requires that alignment defects (alternatively known as 'discontinuities', 'singularities' or 'disclinations') must form (or 'nucleate') in the liquid crystal before the transformation can occur. Observation of a pi-cell (using for example, a polarizing optical microscope) undergoing a transformation from an H-state to a V-state allows the nucleation of such defects to be clearly observed, and their movement through the liquid crystal to be observed as the V-state grows to replace the H-state.

The H- and T-states (twisted state) are also topologically in-equivalent, that is, a transformation from the T- to H-state requires the nucleation and movement of defects within the liquid crystal.

The nucleation of the defects in the liquid crystal alignment that are required to produce transitions between topologically in-equivalent states can be difficult to reliably achieve and control. It is an object of the current patent to reliably and controllably allow the transformation of a pi-cell from one state (e.g., an H-state) into another state (i.e., the V- or T-state).

The V-state and the T-state of a pi-cell are topologically equivalent. So for example, if the voltage on a uniform pi-cell initially in the T-state is smoothly increased, the pi-cell will undergo a uniform and continuous transformation into the V-state, without any requirement for the nucleation and movement of defects. The configurations of two V-states at different voltages are also topologically equivalent, that is a V-state configuration at either voltage can be continuously transformed into the V-state configuration at the second voltage, by the act of varying applied voltage.

SUMMARY OF THE INVENTION

The present invention provides a liquid crystal display device comprising: a chiral liquid crystal layer disposed between first and second substrates, and means for applying a voltage across the liquid crystal layer; wherein a first region of the liquid crystal layer is an active region for display and a second region of the liquid crystal layer is a nucleation region for generating a desired liquid crystal state in the first region when a voltage is applied across the liquid crystal layer, and wherein the ratio of the thickness d of the liquid crystal layer to the pitch p of the liquid crystal material has a first value $(d/p)_A$ in the first region of the liquid crystal layer and has a second value $(d/p)_N$ different from the first value in the second region of the liquid crystal layer.

The second region acts as a nucleation region. The stable state in the second region when no voltage is applied across the liquid crystal layer is chosen such that, when a voltage is applied across the liquid crystal layer, the desired stable state is generated in the active region easily and repeatably.

The value $(d/p)_N$ of the ratio of the thickness d of the liquid crystal layer to the pitch p of the liquid crystal material in the second region of the liquid crystal layer may be selected such that, when no voltage is applied across the liquid crystal layer, the liquid crystal state stable in the second region of the liquid crystal layer is topologically equivalent to the desired liquid crystal state. This facilitates the process of nucleating the desired stable state in the active region.

The first twist angle may be different by 180° from the second twist angle.

The value of the ratio of the thickness d of the liquid crystal layer to the pitch p of the liquid crystal material in the first and second regions of the liquid crystal layer may be selected such that, when no voltage is applied across the liquid crystal layer, a first liquid crystal state having a first twist angle is stable in the first region of the liquid crystal layer, and a second liquid crystal state having a second twist angle different from the first twist angle is stable in the second region of the liquid crystal layer.

The value $(d/p)_N$ of the ratio of the thickness d of the liquid crystal layer to the pitch p of the liquid crystal material in the second region of the liquid crystal layer may be greater than the value $(d/p)_A$ of the ratio of the thickness d of the liquid crystal layer to the pitch p of the liquid crystal molecules in the first region of the liquid crystal layer. The first liquid crystal state may be a 0° twist state and the second liquid crystal state may be a 180° twist state. The 0° twist state may be an H-state.

As noted above, the 180° twist state is topologically equivalent to the desired operating states of a pi-cell. When the invention is applied to a pi-cell, when a voltage is applied across the liquid crystal layer, the desired operating state will grow from the 180° twist state contained in the nucleation region.

An alignment direction on the first substrate may be parallel to an alignment direction on the second substrate, and the values of the ratio of the thickness d of the liquid crystal layer to the pitch p of the liquid crystal molecules in the first and second regions of the liquid crystal layer may be selected such that $(d/p)_A<0.25$ and $0.25\leq(d/p)_N\leq0.75$. These alignment directions will stabilize the 0° twist state in the first region and the 180° twist state in the nucleation region.

The ratio $(d/p)_A$ of the thickness d of the liquid crystal layer to the pitch p of the liquid crystal material in the first region of the liquid crystal layer may be less than 0.125, and it may be less than 0.1. Use of a low d/p ratio means that the brightness of the active region will not be significantly reduced.

The device may be a surface mode liquid crystal display device. The device may be a pi-cell. The desired liquid crystal state in the active region may be a V-state.

The device may be a reflective liquid crystal display device. The second liquid crystal layer region may be disposed at a via-hole. It is normal for a reflective liquid crystal display device to incorporate via holes, for example to enable electrical connection to a reflective electrode. The thickness of the liquid crystal layer in a via-hole region will be greater than the thickness of the liquid crystal layer elsewhere, and so the thickness-to-pitch ratio will be greater in the via hole region than elsewhere. Thus a via-hole region can conveniently be used as a nucleation region in a liquid crystal display device according to the present invention. In this embodiment, no additional processing steps are required to obtain a region of increased thickness-to-pitch ratio of the liquid crystal layer to act as the nucleation region.

The device may be a transmissive and reflective liquid crystal display device. The second region may be provided in a transmissive region in the transmissive and reflective liquid crystal display device. The nucleation region and the active region may be provided in a display region in the transmissive and reflective liquid crystal display device.

The twist of the liquid crystal layer in the second region of the liquid crystal layer may be non-zero and may be opposite to the natural twist of the liquid crystal molecules, and the value $(d/p)_N$ of the ratio of the thickness d of the liquid crystal layer to the pitch p of the liquid crystal molecules in the second liquid crystal region may be smaller than the value $(d/p)_A$ of the ratio of the thickness d of the liquid crystal layer to the pitch p of the liquid crystal molecules in the first region of the liquid crystal layer.

An alignment direction on the first substrate may be at an angle $\phi$ to an alignment direction on the second substrate, and the values of the ratio of the thickness d of the liquid crystal layer to the pitch p of the liquid crystal molecules in the first and second regions of the liquid crystal layer may be selected such that:

$$\left(\frac{d}{p}\right)_a \leq \frac{\phi}{2\pi} - \frac{1}{4}; \text{ and } \left(\frac{d}{p}\right)_N > \frac{\phi}{2\pi} - \frac{1}{4}$$

The pitch $p_A$ of the liquid crystal molecules in the first region of the liquid crystal layer may not be equal to the pitch $p_N$ of the liquid crystal molecules in the second region of the liquid crystal layer.

The thickness $d_A$ of the liquid crystal layer in the first region of the liquid crystal layer may not be equal to the thickness $d_N$ of the liquid crystal layer in the second region of the liquid crystal layer.

The voltage applying means may be arranged to apply the voltage across the first and second regions. For example, the first region may surround the second region. Alternatively, the voltage applying means may be arranged not to apply the voltage across the second region. For example, the second region may be disposed in an inter-pixel gap.

A voltage may be applied to the nucleation region for substantially the same amount of time as an amount of time during which a voltage is applied to a display region of the liquid crystal display device.

The liquid crystal display device may further comprise a storage capacitor. The nucleation region may be provided in the vicinity of the storage capacitor.

The present invention also provides a liquid crystal display device comprising: a liquid crystal layer disposed between first and second substrates, and means for applying a voltage across the liquid crystal layer. The liquid crystal layer includes a first region having a first thickness, and a second region adjacent to the first region having a second thickness. A first state of the liquid crystal layer in the first region and a second state of the liquid crystal layer in the second region coexist under a predetermined condition. The first state is topologically different from the second state.

The predetermined condition may be the absence of an applied voltage across the liquid crystal layer.

The first state may be the H-state and the second state may be a T-state.

A tilt angle of the liquid crystal layer may be defined by the liquid crystal layer and the first substrate. A tilt angle of the liquid crystal layer in the first region may be substantially equal to a tilt angle of the liquid crystal layer in the second region.

The first state and the second state may be the V-states in the presence of an applied voltage across the liquid crystal layer.

BRIEF DESCRIPTION OF THE DRAWINGS

Preferred embodiments of the present invention will now be described by way of illustrative example with reference to the accompanying figures in which;

FIGS. 16A and 16B show a liquid crystal display device including a 180° twist region and a splay region.

DESCRIPTION OF THE PREFERRED EMBODIMENTS

The principle of the present invention will be described below. Liquid crystal used in the present invention adopts four different states depending on the magnitude of an applied voltage. The four different states are herein called a first state, a second state, a third state, and a fourth state which can exist in the presence of a low applied voltage under a typical environment, defined by having an ascending order of the magnitude of a minimum applied voltage. The liquid crystal is designed so that the topologically different first and second states coexist in adjacent regions under predetermined conditions. The predetermined conditions are defined, for example, by a specified voltage (including a voltage zero) being applied across the liquid crystal. In this situation, if a voltage greater than or equal to the specified voltage is applied across the liquid crystal, the liquid crystal is transitioned from the second state to the third or fourth state. The transition of the second state induces transition of the first state to the third or fourth state in the presence of a voltage. In a liquid crystal display device, display is switched between the third and fourth states. According to the present invention, at least one of the pitch and thickness of a liquid crystal layer is adjusted in order to allow the first and second states to coexist in adjacent regions.

Figure 1:
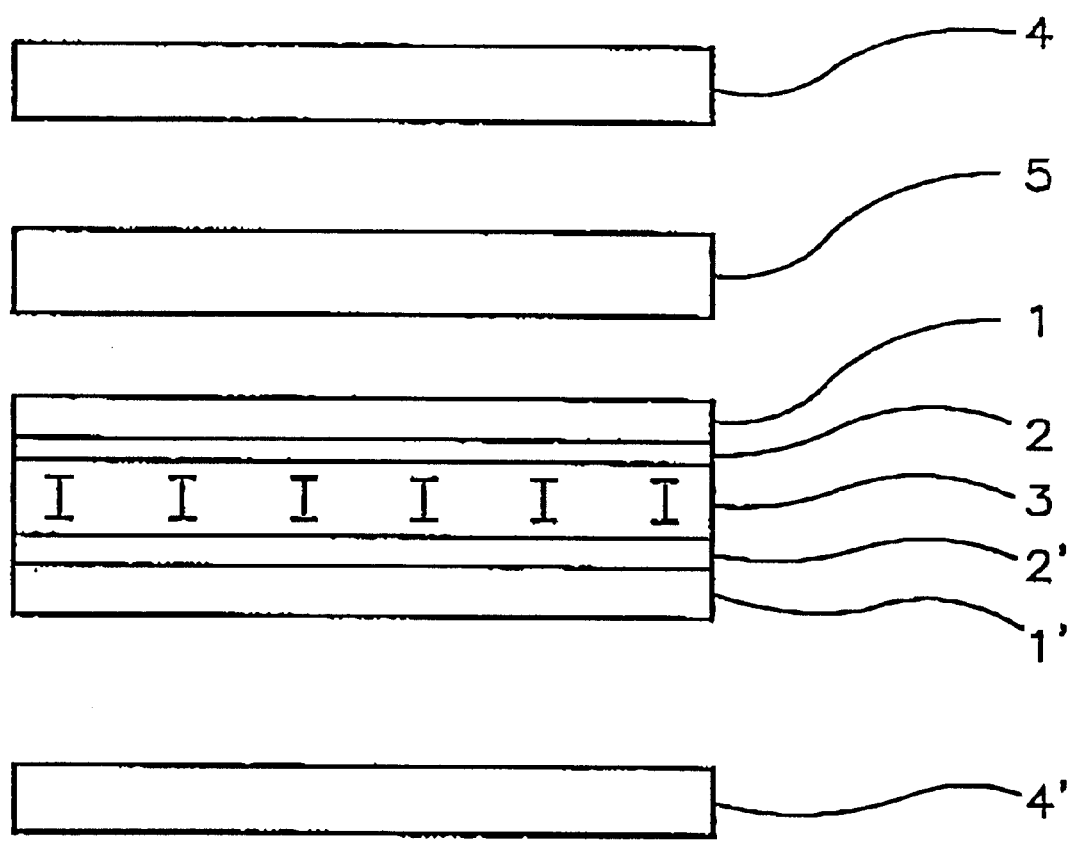
FIG. 1 is a schematic sectional view of an OCB device (pi-cell)
Figure 2:
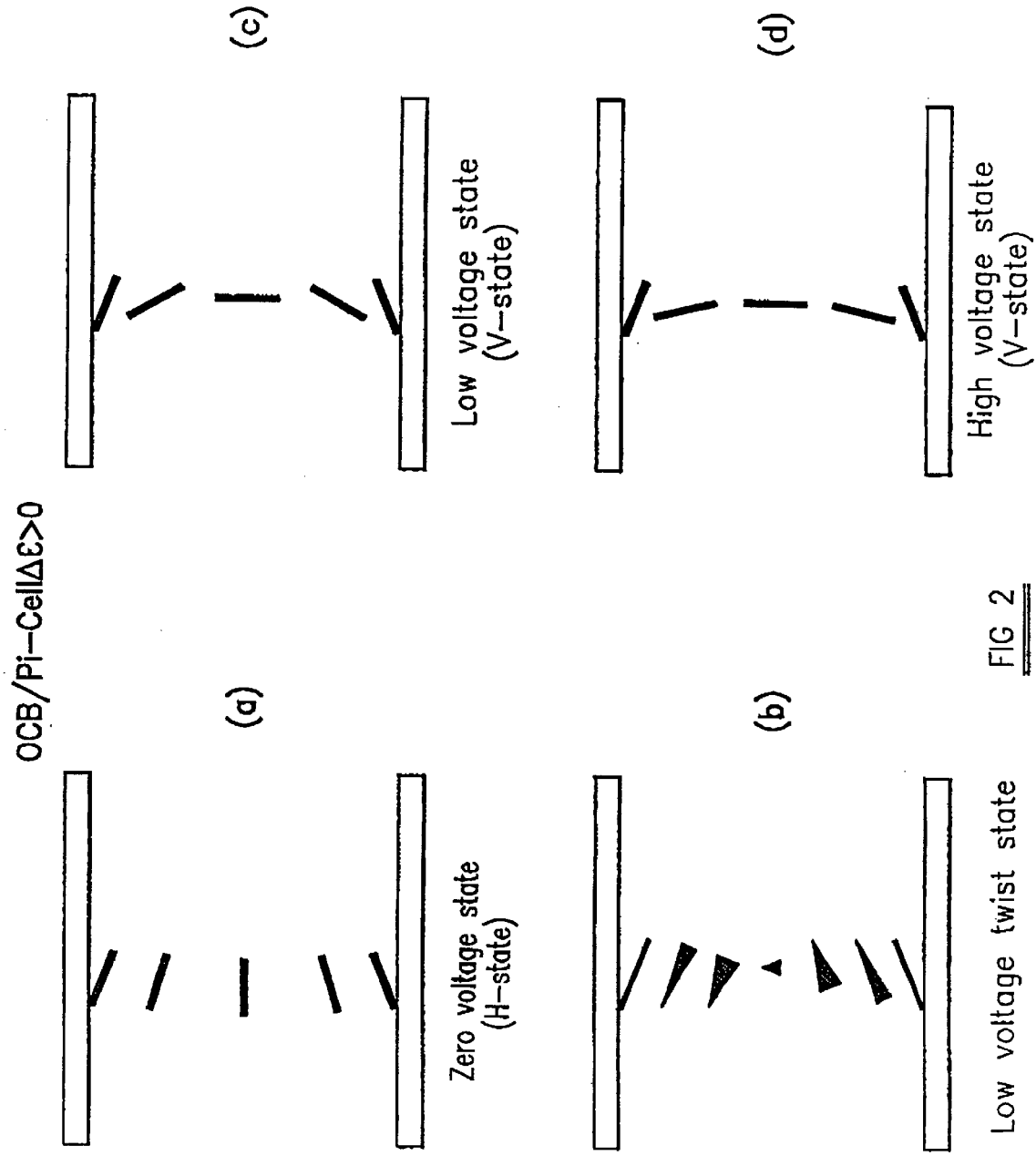
FIGS. 2A to 2D illustrate the principle of operation of an OCB device.

FIG. 2 illustrates operation of an OCB device as an exemplary liquid crystal display device according to the present invention. As noted above, the operating states are the two V-states (corresponding to the third and fourth states) shown in FIGS. 2C and 2D, and the device is operated by switching the liquid crystal state between these two V states. It is necessary to apply a finite voltage across the liquid crystal layer in order to obtain either of the V-states and if the applied voltage is reduced below a critical threshold value then the liquid crystal relaxes to the H-state (corresponding to the first state) shown in FIG. 2A. In order for operation of the device to be recommenced, the liquid crystal layer must be put back into a V-state.

When the voltage applied across the liquid crystal layer in reduced below the threshold voltage, a 180° twist state (corresponding to the second state) as shown in FIG. 2B appears initially, before the appearance of the H-state shown in FIG. 2A. The 180° twist state (T-state) is topologically equivalent to the V-states shown in FIGS. 2C and 2D, but is topologically distinct from the H-state of FIG. 2A. The 180° twist state is stable only for a small range of applied voltage, and as the voltage is reduced to zero, the 180° twist state is superseded by the H-state. The 180° twist state is an example of the T-state.

The presence of the 180° twist state during the transition from a V-state to the H-state has generally not been considered to be relevant to, or useful in, the operation of a pi-cell. The present invention, however, aims to allow the first state (e.g., H-state) and the second state (e.g., T-state) to coexist in adjacent regions in a liquid crystal layer under predetermined conditions. When a voltage greater than or equal to the voltage of the predetermined conditions (including a voltage zero) is applied across the liquid crystal layer, the second state region will act as a nucleation region and will generate the third and fourth states (e.g., V-state) which can then become an active region of the device (or the remainder of the active region if the nucleation region is disposed within the active region). In the foregoing, the first and second states are the H-state and the T-state, respectively. The present invention is not limited to this.

Further, in the above-described OCB device, two states (H-state and T-state) are adopted at a zero applied voltage. The present invention is not limited to this. For example, even when both the nucleation region and the active region are in the H-state at a virgin state just like a liquid crystal panel left alone for a long time, after both regions become V-state in a high applied voltage, the nucleation region may back to the T-state in the presence of a zero or low applied voltage. In this case, the liquid crystal of the nucleation region is transitioned from the T-state to the V-state in the presence of a greater applied voltage than that low applied voltage, leading to transition of the liquid crystal in the active region to the V-state in the presence of an applied voltage.

Figure 3:
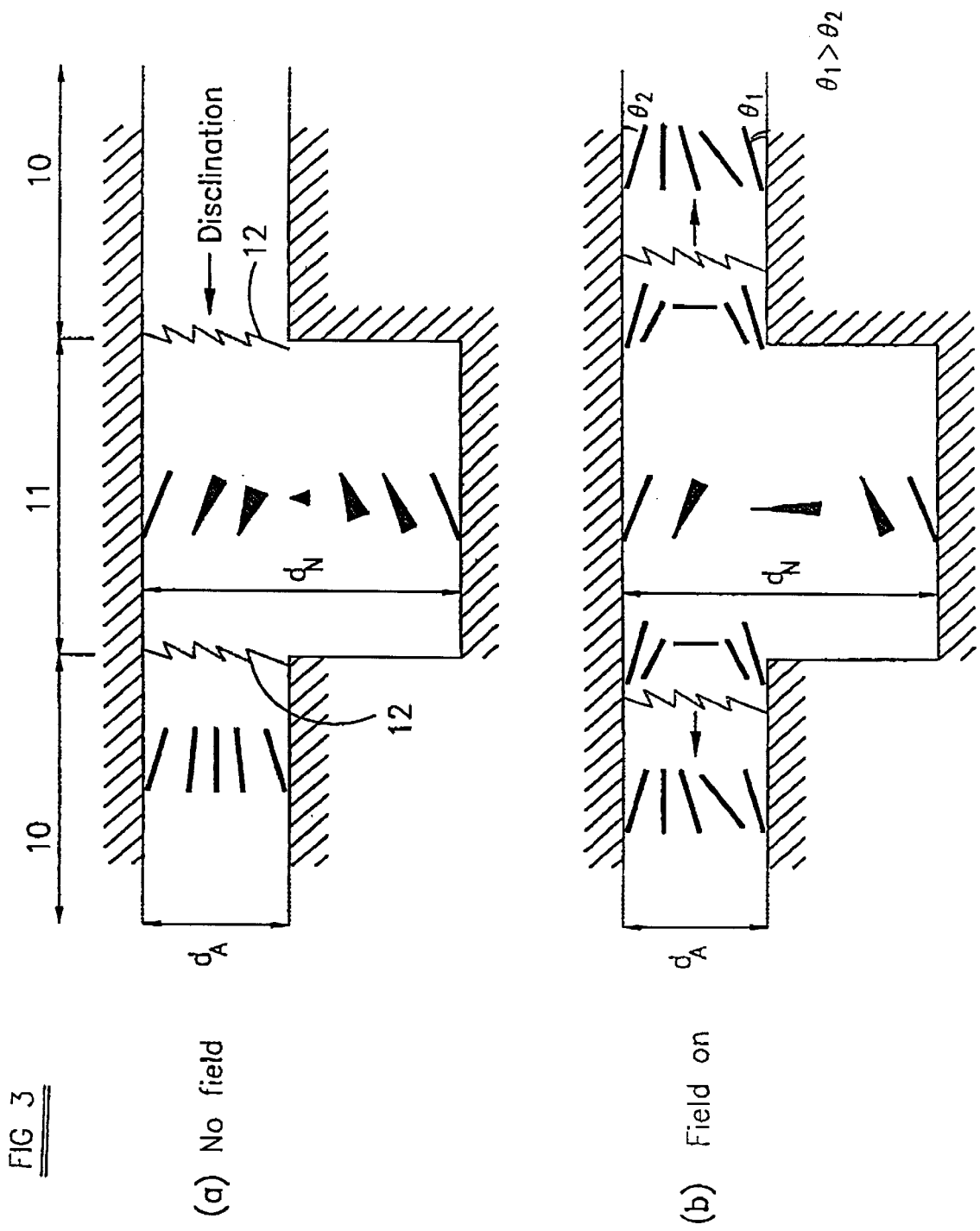
FIGS. 3A and 3B are schematic sectional views illustrating the principle of the present invention.

FIGS. 3A and 3B schematically show a specific example of an OCB device according to the present invention. FIGS. 3A and 3B show a liquid crystal display device according to an embodiment of the invention in the state of zero applied voltage and a non-zero applied voltage, respectively. The OCB device of FIGS. 3A and 3B includes an active region 10 (first region) and a via hole region 11 (second region) functioning as a nucleation regions.

The present invention uses a liquid crystal layer that contains a twisted liquid crystal material. This can be either a combination of a liquid crystal material such as a nematic liquid crystal material and a chiral dopant, or it can be a liquid crystal material that is intrinsically chiral such as a cholesteric liquid crystal material.

According to the present invention, the ratio of the thickness of the liquid crystal layer to the pitch of the liquid crystal material (hereinafter known as the "thickness-to-pitch ratio") is not constant over the entire liquid crystal layer. The thickness-to-pitch ratio of the active region 10 is preferably selected so as to satisfy the relationship $(d/p)_A < 0.25$, where $(d/p)_A = d_A/p_A$, $d_A$ is the thickness of the liquid crystal layer in the active region 10 and $p_A$ is the pitch of the liquid crystal material of the liquid crystal layer in the active region 10. The liquid crystal state in the active region is therefore not a twist state, and will be an H-state as in a conventional pi-cell.

In the embodiment of FIGS. 3A and 3B, the nucleation region 11 has a thickness to-pitch ratio $(d/p)_N$ that is greater than the thickness to-pitch ratio $(d/p)_A$ of the active region. The ratio $(d/p)_N = d_N/p_N$, where $d_N$ is the thickness of the liquid crystal layer in the nucleation region 11 and $p_N$ is the pitch of the liquid crystal material of the liquid crystal layer in the nucleation region 11.

The thickness $d_N$ of the liquid crystal layer in the nucleation region 11 and the pitch $p_N$ of the liquid crystal material in the nucleation region are preferably selected such that $0.25 \leq (d/p)_N \leq 0.75$. As a result, a 180° twist state is stabilized within the nucleation region when no voltage is applied across the liquid crystal layer. A disclination 12 exists at the boundary between the 180° twist state of the nucleation region 11 and the H-state of the active region 10.

In the embodiment of FIGS. 3A and 3B, the pitch of the liquid crystal material in the active region 10 is equal to the pitch of the liquid crystal material in the nucleation region 11. That is, $p_A = p_N$, and the variation in the thickness-to-pitch ratio is obtained by making $d_A \neq d_N$.

In order to put the device of FIG. 3A into its operating state, it is necessary to apply a voltage across the liquid crystal layer that is greater than a threshold value at which the Gibbs free energy of the H-state and the V-state are equivalent. When a voltage equal to this threshold voltage is applied, the relative stability of the states changes to favor the V-state over the H-state. The V-state, which can be considered as a distorted twist state, can then grow from the 180° twist state in the nucleation region 11 into the active region 10, and will replace the H-state throughout the active region.

Where the embodiment of FIGS. 3A and 3B is applied to an active matrix TFT device, it is preferable for the nucleation region 11 to be disposed beneath the black mask of the device.

The threshold voltage required to nucleate the V-state into the active region 10 in a device of the type described in FIGS. 3A and 3B is typically around 2 V. This is a considerably lower voltage than required to nucleate the V-state in a conventional pi-cell not provided with a nucleation region.

The thickness-to-pitch ratio of the active region of the liquid crystal device shown in FIGS. 3A and 3B can typically be reduced to around 0.1. The thickness-to-pitch ratio of the active region of the liquid crystal device shown in FIGS. 3A and 3B is preferably below 0.25, more preferably below 0.125, and more preferably below 0.1. The brightness of the active region of the device is therefore greater than an active region of a device of the type disclosed in U.S. Pat. No. 4,566,758 in which the d/p ratio must be at least 0.25 in order to stabilize the 180° twist state in the active region.

It is particularly easy to apply the present invention to a reflective liquid crystal display device, since these generally have a liquid crystal layer that contains a region of increased thickness as a result of a need to provide a via hole to allow a reflective electrode to be connected to, for example, a switching element. Using the via-hole as the nucleation region eliminates the need for additional processing steps in the manufacture of the nucleation region.

In FIG. 3A, the liquid crystal layer adopts two states (H- and T-states) in the state of a zero applied voltages The present invention is not limited to this. Even when the liquid crystal layer adopts one state (e.g., H-state) in the state of a zero applied voltage, if the liquid crystal layer adopts two states (e.g., H- and T-states) at a low applied voltage, the same effect as described above can be obtained.

Figure 4:
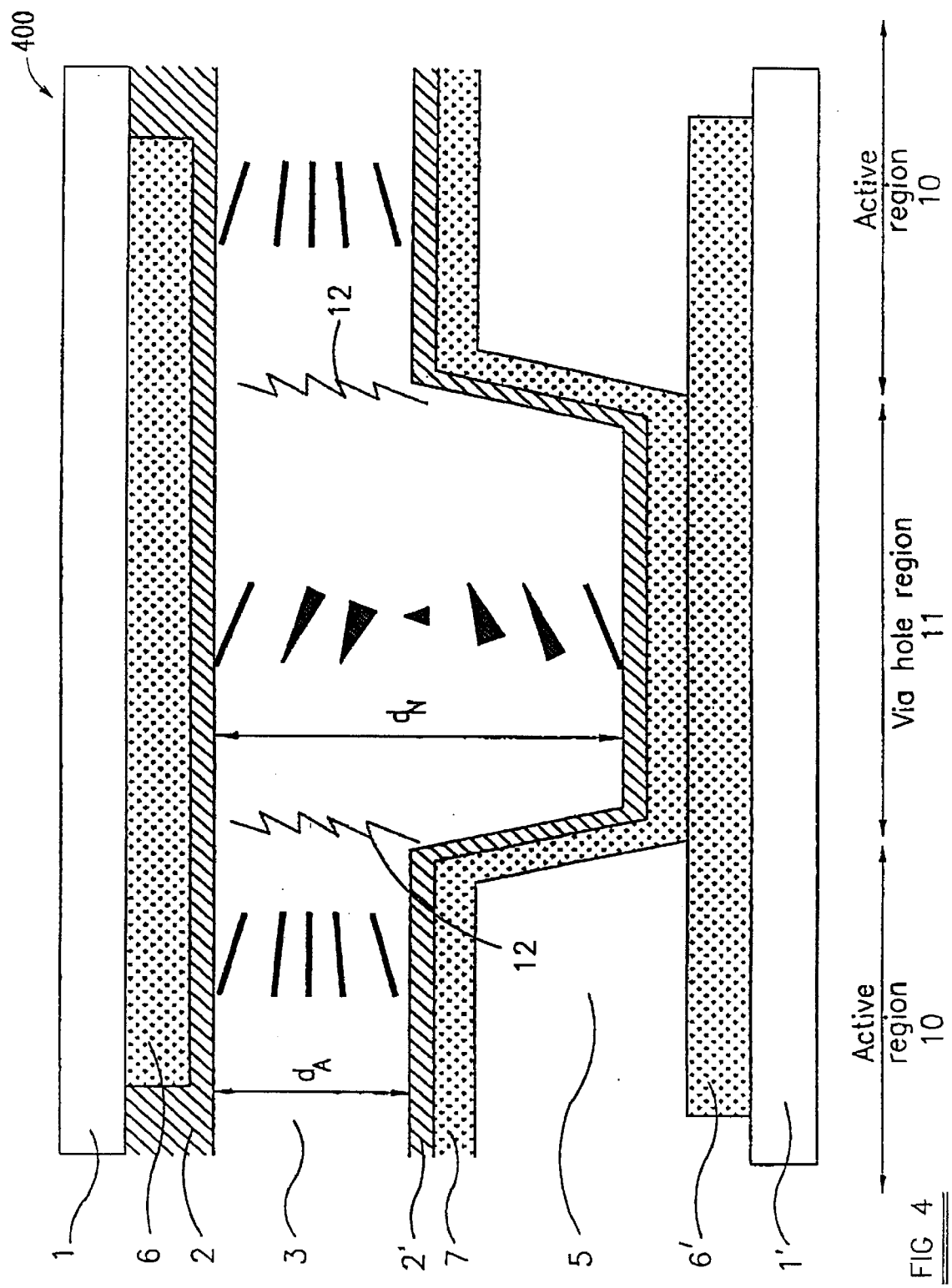
FIG. 4 is a schematic sectional view of a liquid crystal display device according to an embodiment of the invention when no voltage is applied across the liquid crystal layer.

FIG. 4 is a cross-sectional view of a reflective liquid crystal display device 400 embodying the present invention. This shows a via-hole region 11 disposed within an active region 10. The liquid crystal display device 400 of FIG. 4 is under a predetermined condition, specifically in the absence of an applied voltage across the liquid crystal layer or in the presence of a low applied voltage. The thickness of the liquid crystal layer in the active region is $d_A$, and in the via-hole region is $d_N$. The pitch of the liquid crystal material in the active region 10 is equal to the pitch of the liquid crystal material in the nucleation region 11. In this embodiment of the invention, the via-hole region has a greater thickness-to-pitch ratio and so can be used as a nucleation region.

The device shown in FIG. 4 comprises upper and lower substrates 1, 1'. An upper electrode 6 is disposed on the upper substrate, and this is covered by an upper alignment layer or film 2. The electrode 6 is a transparent electrode, for example formed of indium tin oxide (ITO). The upper alignment layer 2 is a conventional alignment layer, and is for example formed of a layer of polymeric material that is unidirectionally rubbed so as to define the alignment direction and pre-tilt angle of liquid crystal molecules in contact with the upper alignment film 2.

A reflective electrode layer 7 is disposed on the lower substrate 1'. A lower alignment layer 2' is disposed over the lower electrode. An electrode 6', for example the output electrode of a switching element (not shown) in the case of an active matrix display device, is disposed on the lower substrate 1'. In the active regions of the device the reflective electrode 7 is separated from the electrode 6' by a layer 5 of an insulating material. In the via-hole region, however, the insulating layer 5 is not provided so that the reflective electrode 7 makes electrical contact with the electrode 6'. As a consequence of the absence of the insulating layer 5 in the via-hole region 11, the thickness of the liquid crystal layer in the via hole region is greater than the thickness of the liquid crystal layer in the active region 10.

In the embodiment of FIG. 4 the rubbing direction of the upper alignment film 2 is parallel to the rubbing direction of the lower alignment film 2'. The liquid crystal layer is therefore constrained to adopt states having a twist angle of 0°, 180°, 360° etc.

In the embodiment of FIG. 4 the liquid crystal layer contains a nematic liquid crystal and a chiral dopant. Although the nematic liquid crystal does not have an intrinsic twist, the presence of the chiral dopant induces a twist in the liquid crystal material. A suitable liquid crystal material is, for example, the material ZLI 6000-100, and a suitable chiral dopant is the dopant CB15 (produced by Merck, Darmstadt, Germany).

The amount of chiral dopant in the liquid crystal layer is chosen such that the thickness-to-pitch ratio in the active region 10 is less than 0.25. This is not sufficient to bias the liquid crystal material into the 180° twist state, so the stable liquid crystal state in the active region is constrained to be a 0° twist state. Thus, at zero applied voltage the active region behaves like a conventional OCB device, and the stable state will be an H-state.

In the structure of FIG. 4 in the absence of an applied voltage to the liquid crystal layer, the pitch of the twist of the liquid crystal material is also selected so that the thickness-to-pitch ratio in the via-hole region 11 is greater than or equal to 0.25 but less than 0.75, so that the liquid crystal material in the via-hole region is biased into a 180° twist state. The via-hole region thus acts as a nucleation region.

As noted above, the brightness of a liquid crystal layer decreases as the amount of chiral dopant is increased, so that it is preferable to minimise the amount of chiral dopant used, subject to the d/p ratio in the nucleation region being $(d/p)_N \geq 0.25$ so as to stabilize the 180° twist state in the nucleation region.

Disclinations 12 are present at the boundary between the 180° twist state of the via-hole region and the H-state of the active region.

Figure 5:
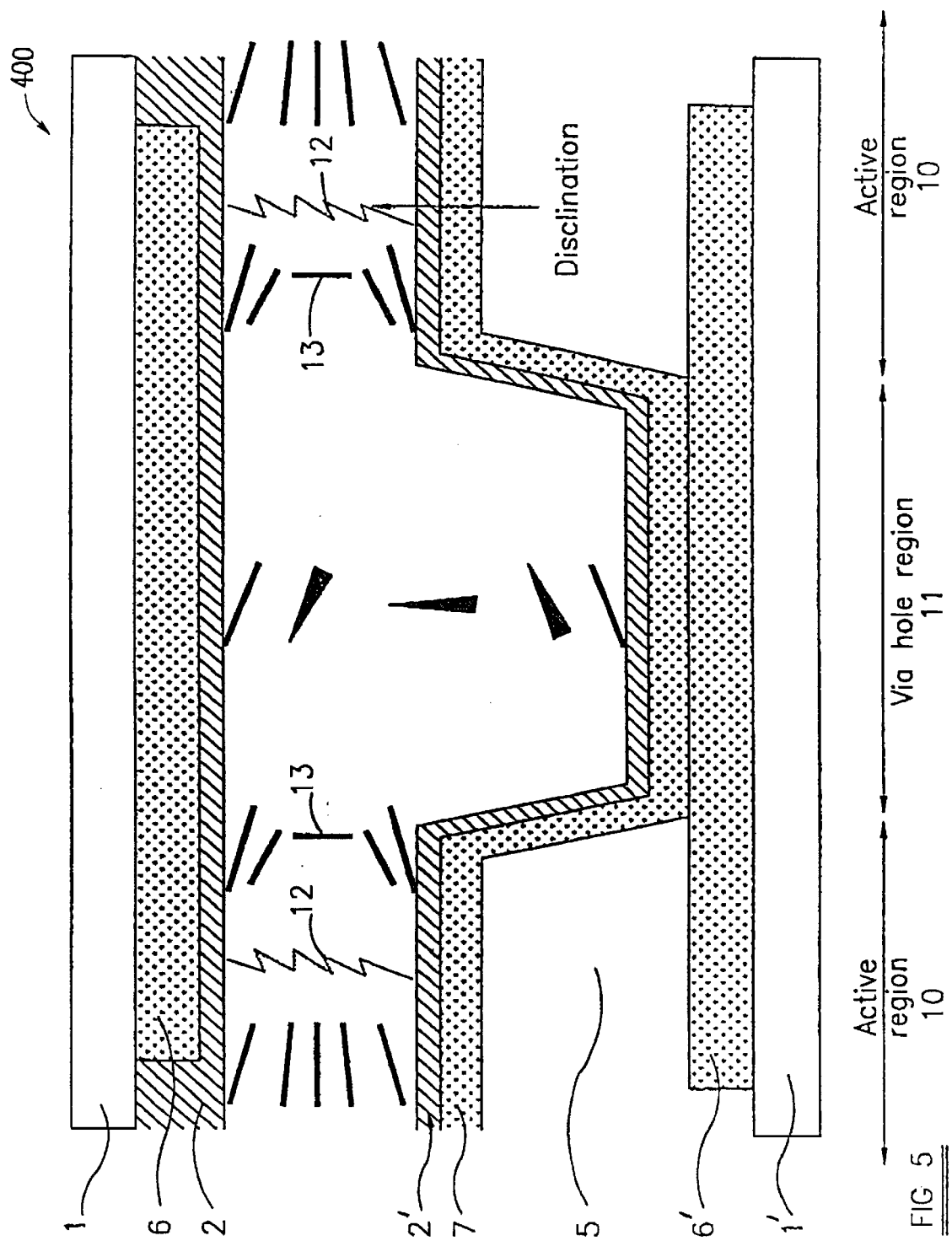
FIG. 5 is a schematic sectional view of the liquid crystal display device of FIG. 4 when a voltage is applied across the liquid crystal layer.

FIG. 5 shows the liquid crystal display device of FIG. 4 when a greater voltage is applied across the liquid crystal layer. When a voltage greater than the critical threshold voltage referred to above is applied, the V-state 13 grows from the via-hole region 11 into the active region 10. The disclinations 12 propagate away from the boundary between the via-hole region and the active region, and eventually the V-state is the stable state throughout the active region 10. To nucleate the V-state into the active region 10 from the via-hole region 11 it is in principle sufficient for the applied voltage to just exceed the threshold voltage. However, the speed of growth of the nucleated V-state would be very slow at a voltage that only just exceeds the threshold voltage, and hence it is preferable to use a voltage significantly greater than the threshold voltage in order to reduce the time taken for the V-state to nucleate into the active region 10.

Once the V-state has nucleated into the active region, the device can be operated between a low voltage V-state and a high voltage V-state in the conventional manner described with reference to FIGS. 2C and 2D.

The thickness $d_A$ of the active region 10, the thickness $d_N$ of the via-hole region 11, and the pitch p of the twist of the liquid crystal material can be selected to give any values that satisfy the requirements:

$$(d/p)_A = d_A/p < 0.25 \qquad (1)$$

and $$0.25 \leq (d/p)_N = d_N/p \leq 0.75 \qquad (2).$$

However, as noted above, it is preferable for the d/p ratio in the active region to be low, in order to minimise the amount of chiral dopant and improve the brightness of the active region. As an example, the liquid crystal layer in the via-hole region 11 may have a thickness of 6 μm, and the pitch of the liquid crystal molecules may be 24 μm, so that the ratio $d_N/p = 0.25$. If the thickness of the liquid crystal layer in the active region 10 of the pixel is 3 μm, then the d/p ratio in the active region is 0.125.

For clarity, the invention has been described above with reference to a liquid crystal display device that incorporates one active region and one nucleation region. The invention is not limited to this simple case, however, and a practical display device will generally incorporate a large number of active regions each of which may be provided with a nucleation region in accordance with the invention.

Figure 6:
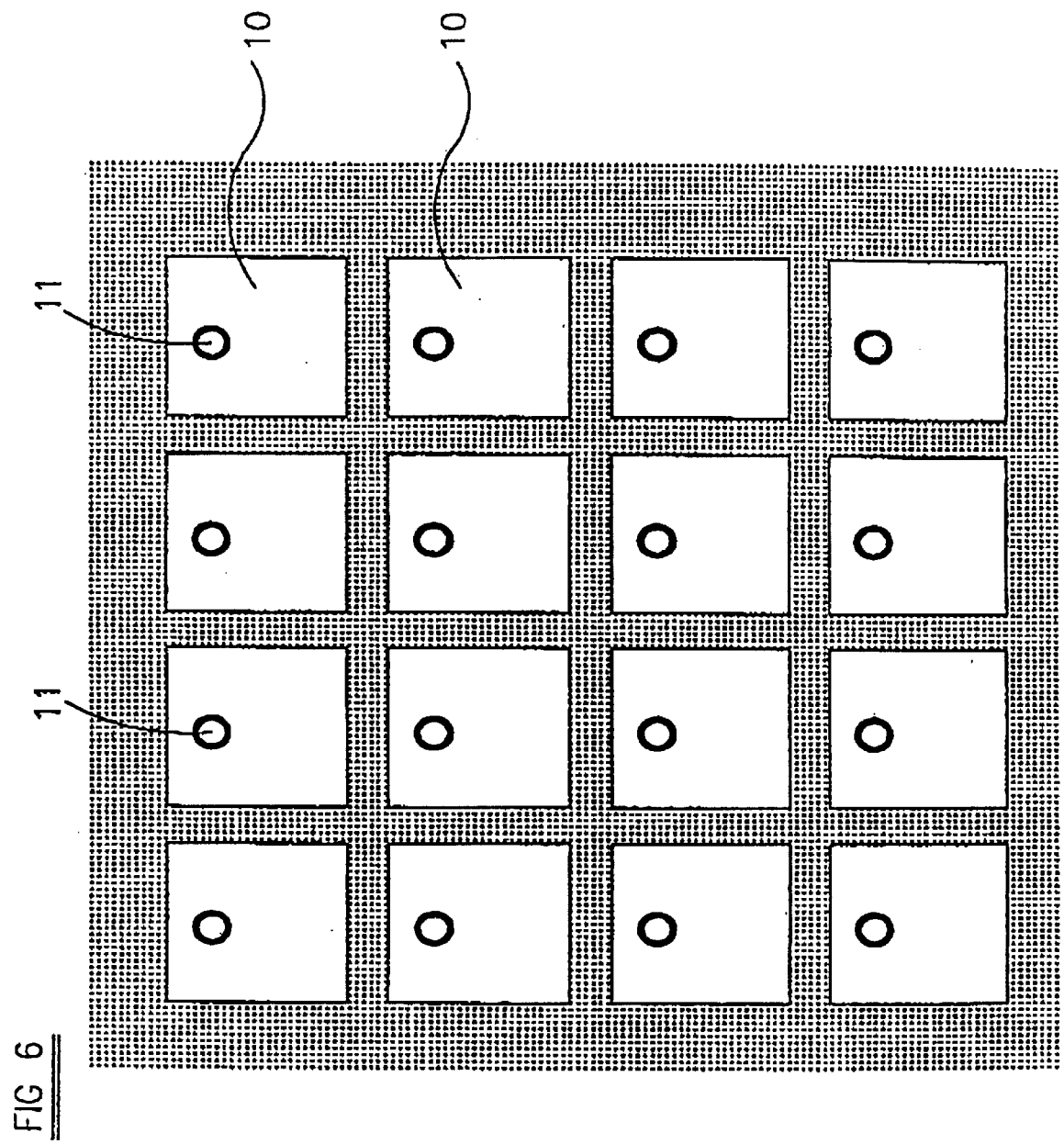
FIG. 6 is a schematic plan view of a liquid crystal device according to an embodiment of the invention.

FIG. 6 is a plan view of a liquid crystal display device according to the present invention. It will be seen that the device contains a plurality of independently addressable active regions 10. The active regions can be produced by, for example, patterning the reflective electrode 7 so as to provide a plurality of independently addressable electrodes each defining an independently addressable region, or pixel, of the liquid crystal display device. The reflective electrode 7 in each active region 10 is provided with a via-hole 11 to enable electrical connection to a switching element. Thus, the device of FIG. 6 is a reflective, pixelated active matrix liquid crystal display device, having short nucleation times. The device can be used, for example, as a projection apparatus, or as a helmet—mounted display device.

Figure 7:
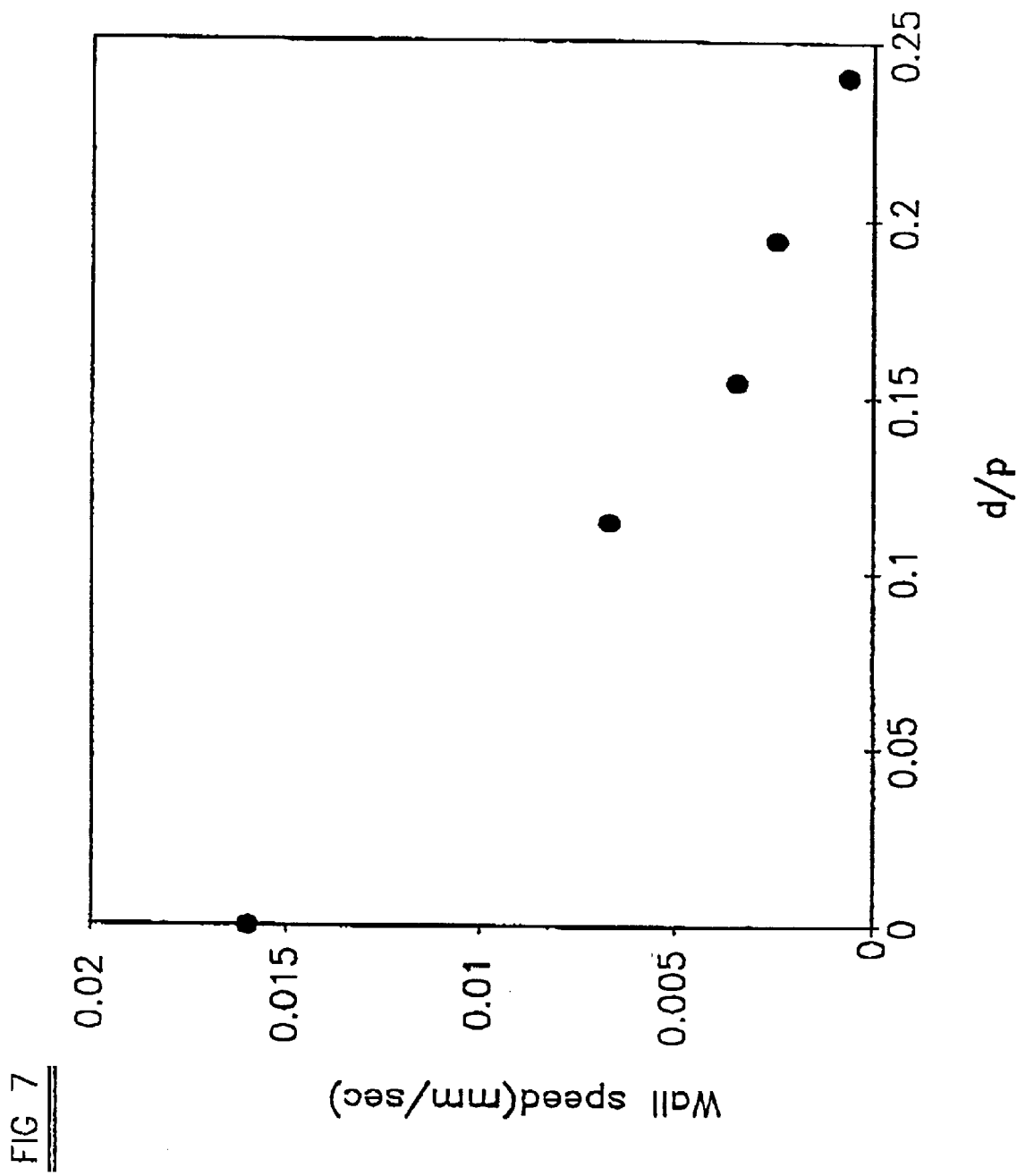
FIG. 7 shows the dependence of the speed of propagation of a dislocation in a liquid crystal material as a function of the d/p ratio.

A further advantage of the present invention is that, if the voltage applied across the active region is reduced to a value such that the H-state becomes the stable state, then the speed at which a randomly nucleated region of the H-state grows back across the active region will be slower than in a conventional pi-cell. This is shown in FIG. 7, which illustrates the speed of propagation of a boundary of a growing H-state in a pi-cell having a liquid crystal layer thickness of 6.2 μm at a temperature of 25° C. FIG. 7 relates to the liquid crystal material ZLI6000-100 and shows the variation in the speed of the boundary as the d/p ratio of the liquid crystal material is altered by the addition of the chiral dopant CB15.

It will be seen from FIG. 7 that increasing the d/p ratio decreases the speed of propagation of the boundary of the H-state. Thus, the speed of propagation of the boundary of an H-state region in the active region 10 of the device of FIG. 4 with d/p>0 will be slower than the speed of propagation in a conventional pi-cell having a d/p ratio of zero.

Figure 8:
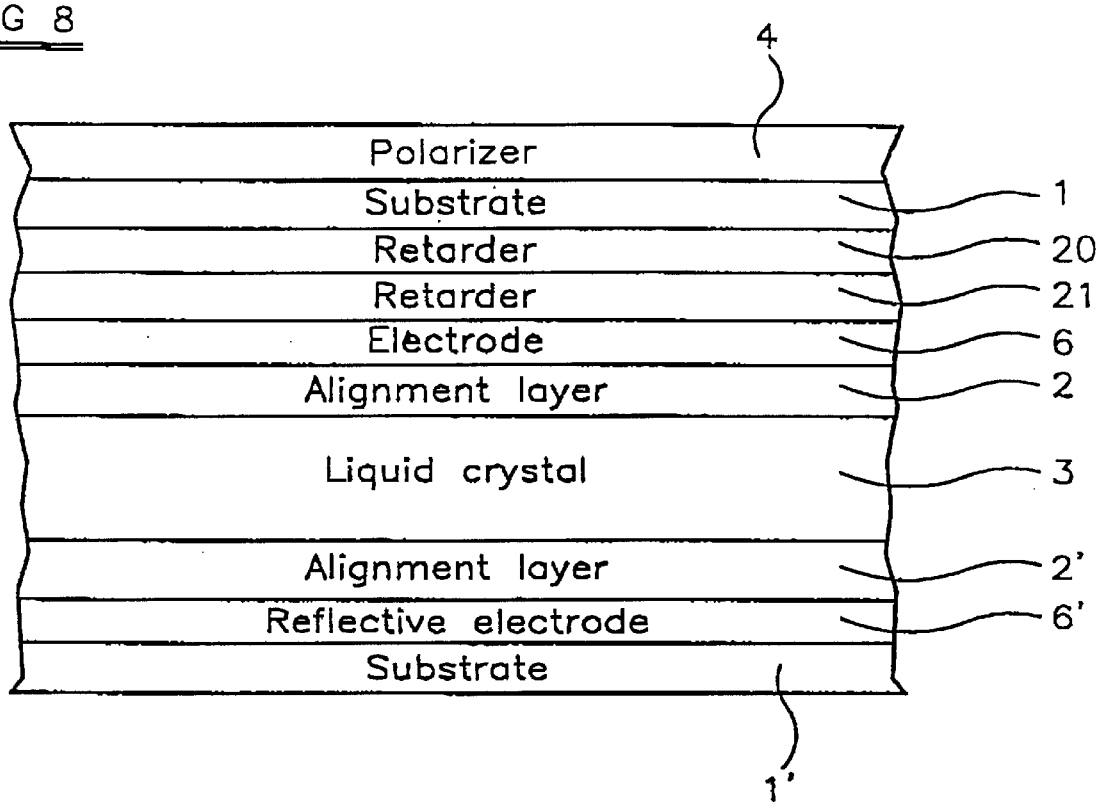
FIG. 8 is a schematic sectional view of a liquid crystal display device according to a further embodiment of the present invention.
Figure 9:
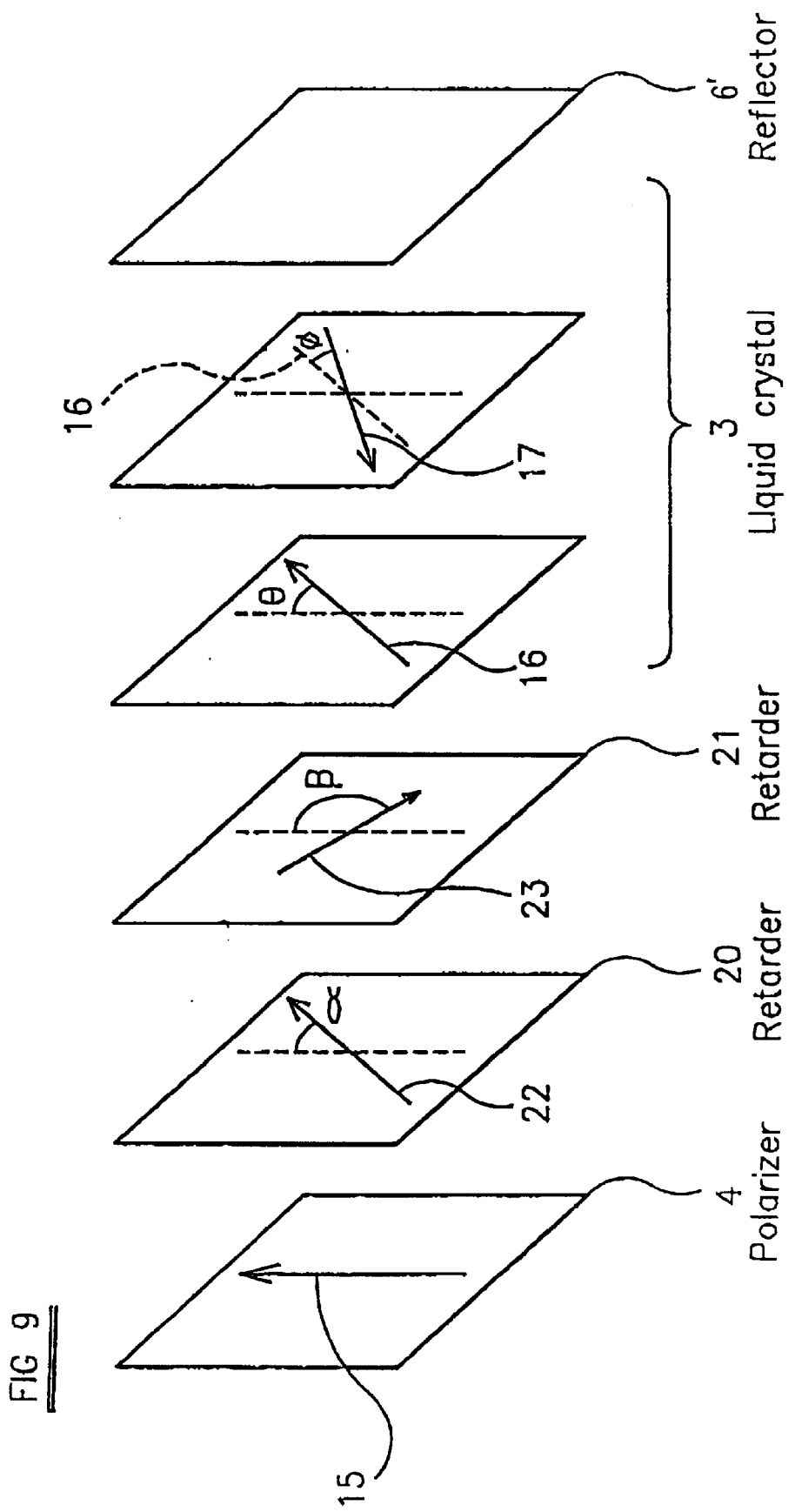
FIG. 9 is a schematic perspective view of the principal optical components of the liquid crystal display device of FIG. 8.

A further embodiment of the invention is illustrated in FIGS. 8 and 9 and comprises a liquid crystal display device having a liquid crystal layer containing a chiral dopant that induces a twist in the opposite direction to the twist induced by the rubbing directions of the alignment films. Such a device is disclosed in co-pending Japanese Patent Application No. BH 11 371 963, filed on Dec. 27, 1999, the contents of which are hereby incorporated by reference.

The device shown in FIG. 8 is of the reflective single polarizer type and may be used as, for example, a pixelated liquid crystal display. The device comprises upper and lower substrates 1, 1'. The upper substrate 1 carries on its inner surface an electrode 6 and an alignment layer 2, for example comprising a rubbed polyimide.

The lower substrate 1' carries on its inner surface a reflective electrode 6', although a separate electrode and reflector may alternatively be provided. An alignment layer 2', for example of the same type as the alignment layer 2 on the upper substrate 1, is formed on the reflective electrode 6'. The upper and lower substrates 1, 1' and the associated layers are spaced apart, for example by spacer balls (not shown), to define a cell containing a liquid crystal layer 3. The layer 3 comprises a chiral liquid crystal material. This may be an inherently chiral liquid crystal material, or it may consist of a nematic liquid crystal to which has been added a chiral dopant.

As shown in FIG. 9, the polarizer 4 has a linear polarizing direction 15. The upper alignment layer 2 has an alignment direction 16 which is oriented at a clockwise angle θ with respect to the polarizing direction 15 of the polarizer 4. The lower alignment layer 2' has an alignment direction 17 which is oriented at a clockwise angle of (θ+φ) so that the liquid crystal layer 3 has a twist of φ in a clockwise or positive direction.

The chiral dopant added to the nematic liquid crystal of the layer 3 is such as to have a twisting effect in the anti-clockwise or negative direction in the device shown in FIG. 8. Thus, if the liquid crystal material of layer 3 were not constrained by the alignment layers 2, 2', it would adopt an anti-clockwise twist because of the chiral dopant. However, the alignment layers 2, 2' induce a positive or clockwise twist φ of less than 90° on the liquid crystal material in the layer 3.

If too much chiral dopant were added to the liquid crystal resulting in too small a value of d/p for the liquid crystal layer 3, then the twist energy of the material of the liquid crystal 3 would be larger than the twist energy of the twisted state induced by the alignment layers 2, 2' and the twist of the liquid crystal layer 3 would change from φ° to (φ−π)°, since φ>0. The amount of chiral dopant which may be added depends on the twist angle and tends to zero as the twist angle tends to 90°. The critical d/p ratio $(d/p)_C$ is given by:

$$\left(\frac{d}{p}\right)_c \le \frac{\phi}{2\pi} - \frac{1}{4} \quad (3)$$

First and second fixed retarders 20, 21 are disposed in the optical path between the polarizer 4 and the liquid crystal layer 3. In FIG. 8, the retarders 20, 21 are disposed between the substrate 1 and the electrode 6 so as not to affect the operating voltage of the device. However, it is in principle possible for either or both of the retarders 20, 21 to be disposed between the electrode 6 and the alignment layer 2, in which case the operating voltage of the device would be increased, or between the polarizer 4 and the substrate 1, in which case the acceptance angle of the display would be reduced.

The retarder 20 has an optic axis 22 disposed at an angle α to the polarizing direction 15 of the polarizer 4, whereas the retarder 21 has an optic axis 23 at an angle β to the polarizing direction is.

Figure 10:
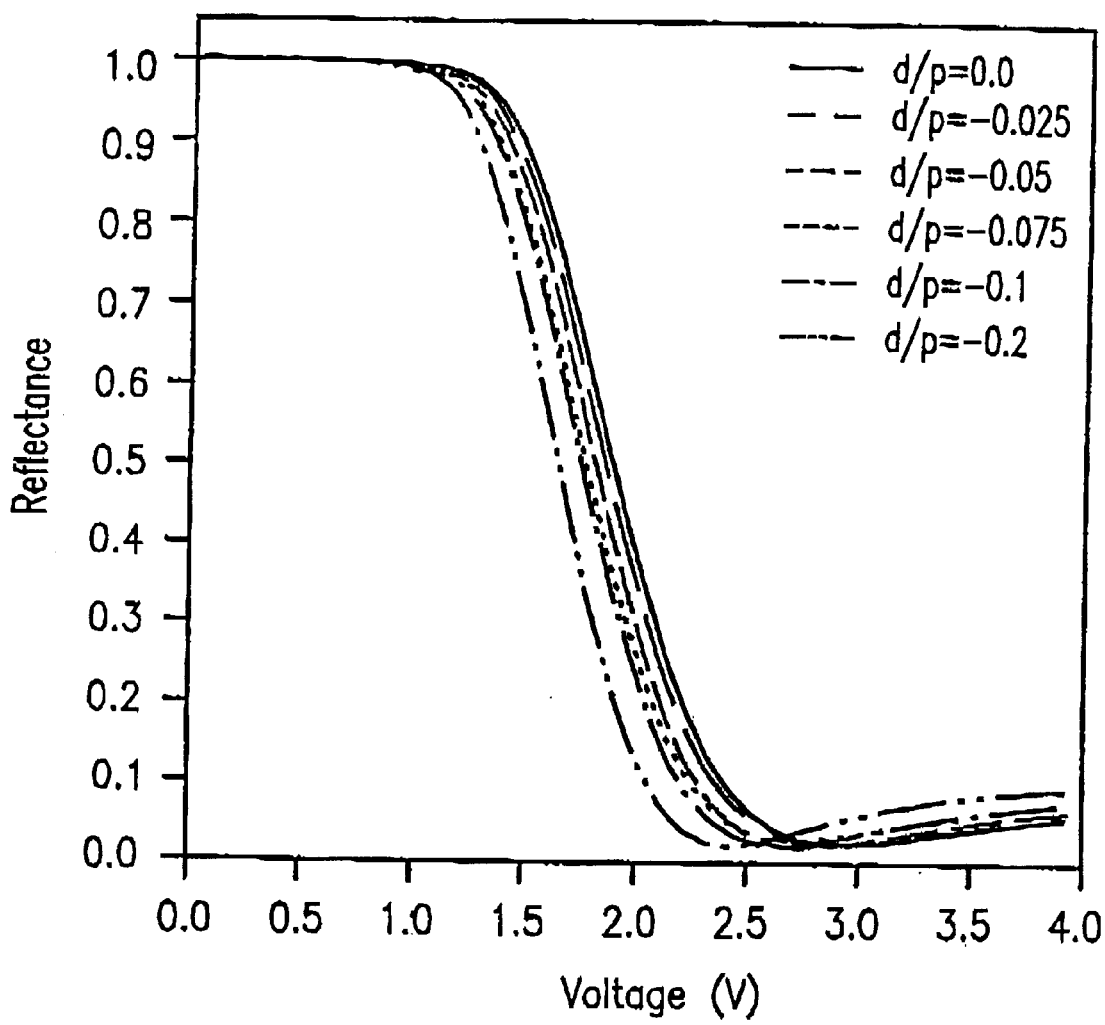
FIG. 10 shows the characteristic curve of reflectance against applied voltage for a reflective liquid crystal display, for various values of the d/p ratio.

FIG. 10 shows the reflectance of a display device of the type shown in FIGS. 8 and 9. The results of FIG. 10 were obtained with a display in which the first retarder 20 has its slow optic axis at 15° to the polarisation direction 15 of the polarizer 4, and has a retardation Δn.d=260 nm. The second retarder has its slow optic axis at 75° to the polarisation direction 15, and has a retardation Δn.d=95 nm. The liquid crystal layer 3 has a twist angle φ=70°, and the angle θ between the polarisation direction 15 and the rubbing direction of the upper alignment layer 2 is θ=40°. The retardation of the liquid crystal layer is Δn.d=200 nm. The thickness of the liquid crystal layer is 3 μm.

As can be seen from FIG. 10, the voltage required to obtain a particular reflectance above the reflectance minimum decreases as the d/p ratio of the liquid crystal layer is decreased from 0. The minimum reflectance does not vary significantly with the d/p ratio.

In the absence of pre-tilt induced in the liquid crystal layer by the alignment layers 2, 2', the dopant limit at which the twist of the liquid crystal layer will change from φ° to (φ−π)° is given by expression (3) above. If the alignment layers induce a non-zero pre-tilt in the liquid crystal molecules adjacent the alignment layers, the magnitude of $(d/p)_C$ is increased.

This embodiment relates to a liquid crystal display device in which the desired operating state has a twist angle φ where 0<φ<90°, with φ being defined by the alignment directions of the alignment layers 2, 2'. As can been seen from FIG. 10, adding a chiral dopant that induces a twist in the opposite direction to the twist induced by the alignment layers (that is, adding a chiral dopant having a pitch p that is negative) leads to a reduction in the reflectance voltage. However, it can be seen from FIG. 10 that the greater reductions in the reflectance voltages are obtained at high dopant concentrations (thus giving a value for d/p that is much less than zero since p is negative). As explained above, a high level of dopant concentration will lead to the stabilisation of an undesired (φ−π)° twist state at zero applied voltage. Therefore, before operating the device It is necessary to nucleate the φ° twist state, and this nucleation is facilitated by providing a nucleation region in which the φ° twist state is stable at zero applied voltage. Upon application of a voltage above a threshold value, the φ° twist state will spread out from the nucleation region into the active region and displace the unwanted (φ−π)° twist state from the active region.

For φ=70°, the critical value of the thickness to pitch ratio is $(d/p)_C$=−0.055. If the liquid crystal layer is reverse doped beyond this limit, the stable twist state in the presence of no applied voltage has a twist (φ−π)°=−110°. In order to access the desired operating state having twist φ in a device in which the liquid crystal layer is reverse doped beyond the critical value, the φ° twist state must first be nucleated and propagated into the active region where the (φ−π)° twist state is stable at zero applied voltage, by application of a voltage greater than the threshold voltage to the liquid crystal layer.

According to a further embodiment of the present invention, the device illustrated in FIGS. 8 and 9 is provided with d nucleation region for nucleating the φ twist state. The thickness-to-pitch ratio of the liquid crystal layer in the nucleation region is different from the thickness-to-pitch ratio of the liquid crystal layer in the active region. In this embodiment, however, the thickness-to-pitch ratio of the liquid crystal layer in the nucleation region is lower than the thickness-to-pitch ratio of the liquid crystal layer in the active region. In a device where the pitch of the liquid crystal material in the active region is equal to the pitch of the liquid crystal material in the nucleation material, the required variation in the thickness-to-pitch ratio between the nucleation region and the active region is obtained by making the thickness of the liquid crystal layer in the nucleation region less than the thickness of the liquid crystal layer in the active region.

The reduced thickness of the liquid crystal layer in the nucleation region may be achieved, for example, by adding small bumps or pillars of a photo-sensitive polymer to create nucleation regions having a lower thickness than the active region. The amount of doping would be selected so that the d/p value was the same as or lower (that is, more negative) than the critical value (which is negative) in the active region, but was greater than the critical value in the nucleation region.

For the device described above having $d_A$=3 μm, the nucleation region could be provided by adding some surface relief having a height of 2 μm on one of the alignment films. This would produce a region in the liquid crystal layer having a thickness of only 1 μm. The amount of doping would be chosen to give a d/p value greater than the critical value of −0.055 (that is, −0.054 or higher) in the nucleation region, giving a d/p value equal to three times that in the areas of the liquid crystal layer having a thickness of 3 μm. As a result, when no voltage is applied across the liquid crystal layer the φ=70° twist state will be stable in the nucleation region, whereas the $(\phi-\pi)°=-110°$ twist state will be stable in the active region. When a voltage is applied across the liquid crystal layer, the $\phi=70°$ twist state in the nucleation region will propagate into the active region, and displace the $(\phi-\pi)°$ twist state.

The present invention guarantees the nucleation of the $\phi=70°$ twist state on application of a suitable voltage to the liquid crystal layer, by providing the nucleation region with a higher value of d/p than $(d/p)_o$ owing to the smaller thickness of the nucleation region compared to that of the active region.

A further application of the present invention is to a reflective display device containing a micro-reflective structure (MRS). An MRS consists of a smoothly varying surface relief that is coated with a reflective material such as aluminum. This surface relief may be employed to provide nucleation regions in the device.

As an example, the super mobile HR TFT reflective LCD produced by Sharp Corporation contains an MRS that is provided on the rear substrate of the device adjacent to the liquid crystal layer. The effect of providing the MRS is to cause the thickness of the liquid crystal layer to vary between 2.4 μm and 3.6 μm. In order to provide a nucleation region, the value of the d/p ratio of the liquid crystal material should be set greater (less negative) than $(d/p)_C$ at a liquid crystal layer thickness of 2.4 μm. This will give a value of d/p which is about 1.25 more negative than $(d/p)_C$ at the nominal thickness of the display (3 μm). As described above, when a voltage is applied across the liquid crystal layer the $\phi-70°$ twist state, which is the stable state in the nucleation region, will then propagate into the active region of the display device.

In the embodiments described above the variation in the thickness-to-pitch ratio between the nucleation region and the active region is obtained by making the thickness of the liquid crystal layer in the active region different to the thickness of the liquid crystal layer in the nucleation region. In the above-described embodiments, the pitch of the liquid crystal material in the nucleation region is equal to the pitch of the liquid crystal material in the active region. The present invention is not, however, limited to this, and it is possible for the pitch of the liquid crystal material in the active region to be different to the pitch of the liquid crystal material in the nucleation region. In such an embodiment of the invention the thickness of the liquid crystal layer in the active region may be the same as the thickness of the liquid crystal layer in the nucleation region, and the difference in pitch of the liquid crystal material makes the thickness-to-pitch ratio in the active region of the liquid crystal layer different to the thickness-to-pitch ratio of the liquid crystal layer in the nucleation region.

Figure 11A:
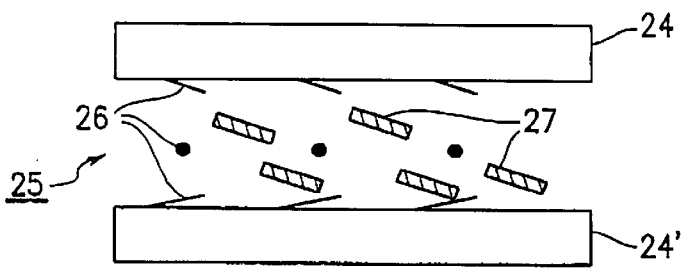
FIGS. 11A and 11B illustrate the method of manufacture of a liquid crystal display device according to a further embodiment of the present invention and FIG. 11C shows liquid crystal display device manufactured by the method of FIGS. 11A and 11B.
Figure 11B:
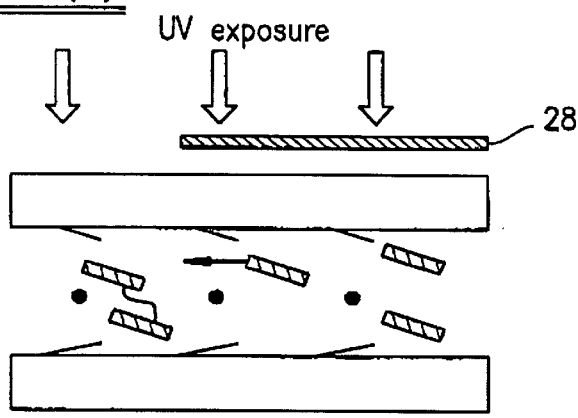
Figure 11C:
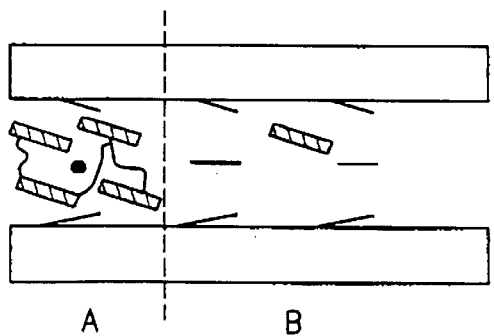

FIG. 11C illustrates a device having a liquid crystal layer that has a constant thickness, but in which the pitch of the liquid crystal layer in one region is different to the pitch of the liquid crystal material in another region. FIGS. 11A and 11B illustrate a method of manufacturing such a device.

Initially, a liquid crystal layer 25 is disposed between upper and lower substrates 24, 24'. The alignment direction on the upper substrate 24 is parallel to the alignment direction on the lower substrate 24'.

The liquid crystal layer contains a liquid crystal material and a chiral dopant. In FIG. 11A, reference 26 indicates liquid crystal molecules, and reference numeral 27 indicates the chiral dopant. The amount of chiral dopant is chosen such that the thickness-to-pitch ratio of the liquid crystal material is greater than 0.25 but less than 0.75, so that the liquid crystal material has a twist angle of 180°.

In FIGS. 11A to 11C, the chiral material is a chiral pre-polymer material. The chiral pre-polymer material has the characteristic that it can be cross-linked to form a polymer network upon exposure to radiation of a suitable wavelength, provided that a suitable photo-initiator material is present.

In FIG. 11B, a selective irradiation process is carried out, in which one region of the liquid crystal layer is irradiated and another region of the liquid crystal layer is not. This can be done, for example, by irradiating the liquid crystal layer 25 through a suitable mask 28, so that part of the liquid crystal layer is shielded by the mask 28 and receives no radiation.

The selective irradiation process of FIG. 11B produces selective polymerization of the chiral pre-polymer material 27 in a spatially varying manner. Any molecules of the chiral pre-polymer material that diffuse into a region that is receiving radiation become polymerised, and remain fixed within the illuminated region. As a result, the concentration of the chiral dopant becomes higher in the region that was illuminated by radiation than in the region that was not illuminated.

FIG. 11C shows the device produced by the selective irradiation process of FIG. 11B, and it can be seen that region A of the liquid crystal layer, which was irradiated, has a much higher concentration of the chiral dopant (which has now been polymerised) than does region B of the liquid crystal layer Which was shielded by the mask 28 during the irradiation step. The increased concentration of chiral dopant in region A of the liquid crystal layer means that the pitch of the liquid crystal material will be lower than in region B, so that the thickness-to-pitch ratio is greater in region A than in region B. Thus, if the chiral dopant induces a twist in the same direction as the twist induced by the alignment films, the region A of increased thickness-to-pitch ratio could act as nucleation region and the region B could act as an active region, in the same way as the region of increased thickness-to-pitch ratio 11 in the device of FIG. 3A acts as a nucleation region.

One example of a chiral pre-polymer material suitable for manufacture of an embodiment of the invention in which the pitch of the liquid crystal material varies is the photo-polymerisable diacrylate material LC589 manufactured by BASF, which has been measured to have a helical twisting power of approximately 67 $\mu m^{-1}$. A suitable nematic liquid crystal material for this embodiment would be the liquid crystal material E7 produced by Merck. An example of a suitable photo initiated material is IrgaCure 369 from Ciba Speciality Chemicals Limited.

In one embodiment, these materials are mixed together in the ratio 100:0.04:0.0004 (E7:LC589: IrgaCure 369). This would provide a chiral liquid crystal mixture with a pitch of a few tens of microns. This mixture can be polymerised by selective irradiation with ultra-violet light.

In the irradiation step of FIG. 11B, the mask 28 substantially blocks radiation, so that the portion of the liquid crystal layer shielded by the mask 28 receives essentially no radiation. In principle, however, the mask 28 does not need to block radiation totally, provided that a shielded part of the liquid crystal layer receives a sufficiently lower intensity of radiation than an unshielded part of the liquid crystal layer.

In principle, the selective irradiation process could alternatively be carried out by irradiating the liquid crystal layer with a beam of radiation having a low cross-sectional area, and scanning the beam across the area(s) of the liquid crystal layer that it is desired to irradiate.

In the method described with reference to FIGS. 11A to 11C, the selective irradiation process produces a spatial variation in the concentration of the chiral dopant within the liquid crystal layer, and it is this variation in the concentration of the chiral dopant that produces the variation in the pitch of the liquid crystal material. In an alternative method of producing a liquid crystal layer that contains variation in pitch, a chiral dopant whose helical twisting power can be selectively altered by irradiation is used. In this method, the selective irradiation process has the effect of altering the helical twisting power of the chiral dopant in the irradiated regions of the liquid crystal layer. Selectively irradiating a liquid crystal layer that contains such a chiral dopant will produce a spatial variation in the helical twisting power of the chiral dopant, and thereby produce a spatial variation of the thickness-to-pitch ratio of the liquid crystal layer.

One example of a chiral dopant whose helical twisting power can be selectively altered by irradiation is a diarylethane chiral dopant such as described by T. Yamaguchi et al in "Photo switching of helical twisting power of a chiral diarylethane dopant in a chiral nematic liquid crystal" in abstracts of The $18^{th}$ international Liquid Crystal Conference, Sendai, Japan, P536 (2000).

In the embodiments described above, the thickness-to-pitch ratio of the active region is made different from the thickness-to-pitch ratio of the nucleation region by making either the thickness of the liquid crystal layer or the pitch of the liquid crystal material different in the active region than in the nucleation region. In principle, however, it would be possible for both the thickness and the pitch to vary between the nucleation region and the active region.

In an embodiment in which a variation in pitch is induced by use of a chiral dopant whose helical twisting power can be selectively altered by irradiation, the spatial variations of pitch of the liquid crystal material that are induced by irradiation could be stabilized by a polymer network that stabilizes a given directive configuration. The polymerization of the polymer network may be achieved by the same irradiation step as is used to induce the variations in pitch or may require a separate irradiation step.

To demonstrate pi-cell nucleation from a point of thickness change in a pi-cell liquid crystal device, a test call was constructed which included a step change in thickness. The cell utilised the negative photoresist material (SU-8, Microlithgraphy Chemical Corporation). A layer of the photoresist was spun onto a clean glass substrate at a speed of 1400 rpm for 25 s to produce a substantially uniform 3 $\mu$m thick film. The glass substrate had previously been uniformly coated with a thin layer of the transparent conductive material, indium tin oxide ('ITO'). The film was baked at 65° C. for 1 min followed by 95° C. for a further minute to drive off any solvent. The film was then cross-linked in selected areas by exposure to UV light for 70 s through a suitable photo-mask. Following a secondary bake at 50° C. for 1 minute followed by 95° C. for 2 minutes, the film was dipped into the solvent solution 'EC' (Microlithgraphy Chemical Corporation) for 60 seconds then rinsed for a further 30 s in fresh EC solvent. This solvent removed those portions of the SU8 film which had been masked from exposure to UV light thereby re-exposing the glass substrate in those areas. Finally the 3 $\mu$m thick step-like regions of crosslinked photoresist were hardened by curing at 180° C. for 1 hour.

In order to investigate the behavior of liquid crystal in a test cell, the substrate once prepared as above, was coated with a thin layer of an alignment material (SE7792, Nissan Chemicals). The alignment material was dissolved in a solvent and spun at 2000 rpm for 25 s to produce a film approximately 50 nm thick. A second clean, uniform, ITO coated, glass plate was also coated with this alignment material. Both plates (the uniform plate and the plate with the patterned, step-like regions of SU8) were then baked at 180° C. for 2 hours to cure the alignment layer. Once cool, both substrates were uni-directionally rubbed with a soft cloth to define an alignment direction for a liquid crystal. The substrates were then assembled with alignment directions parallel (to produce a pi-cell) and separated by 10 $\mu$m using glass spacer beads deposited in a track of glue at the perimeter of the substrates. Finally the gap between the substrates was filled with the commercially available liquid crystal E7 (Merck) The gap between the substrates (and hence the thickness of the LC layer) was 10 $\mu$m, except where 3 $\mu$m high SU8 photoresist features were present, when the layer thickness was reduced to 7 $\mu$m. The liquid crystal E7 had been chirally doped using the commercially available dopant material R1011 (Merck) to produce a pitch in the range 28 $\mu$m<p<40 $\mu$m. As a result those regions of the cell where the liquid crystal layer thickness was 10 $\mu$m had a d/p value of 0.357>d/p>0.25, thereby stabilising a region of 180° twist at 0 V. In comparison, those regions where cell thickness was 7 $\mu$m had 0.25>d/p>0.175 and the stable 0 V state was the splay (or H-) state. In accordance with this invention, as voltage was applied to the completed pi-cell, it was experimentally observed that the thicker regions of stabilized twist acted as regions promoting nucleation at the boundary of the thinner regions of splay state.

A TPT liquid crystal panel according to the present invention will be described in detail below. In this case, preferably, a nucleation region is quickly transitioned to a V-state (bend state) so that a H-state of a display region is promoted to be transitioned from the H-state to the V-state (bend transition). To this end, the nucleation region is provided so as to basically surround a pixel.

Figure 12:
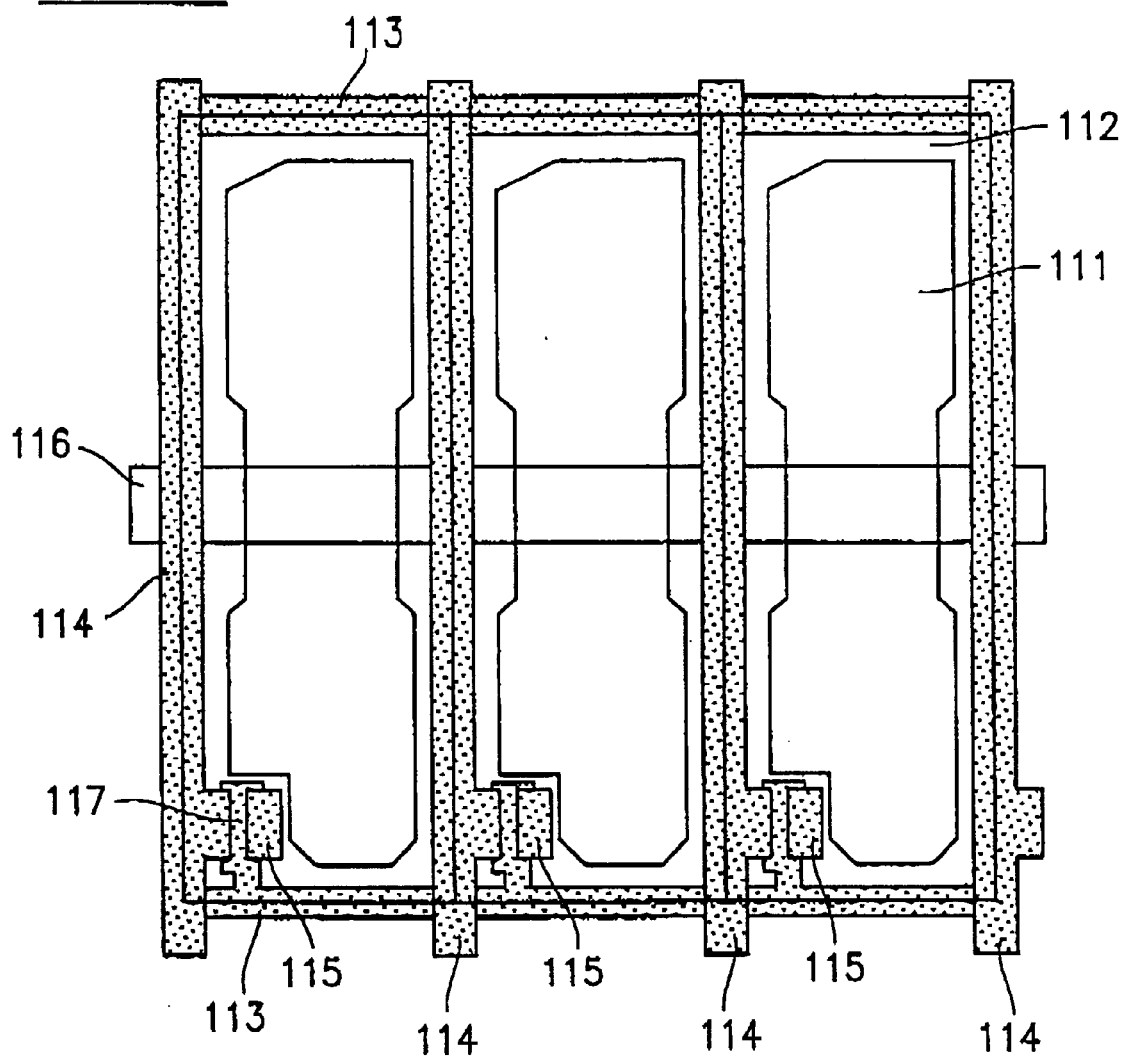
FIG. 12 is an enlarged, top view of a pixel portion of a TFT liquid crystal panel.

The TFT liquid crystal panel includes a TFT substrate (i e., a lower substrate) and a counter substrate (i.e., an upper substrate), and a liquid crystal layer disposed between a pair of the substrates. A color filter (pixel aperture) and a non-pixel region are provided on the counter substrate. FIG. 12 is a top view illustrating an enlarged pixel portion of the TFT liquid crystal panel. A TFT 117, a gate electrode 113 for controlling the TFT 117, a source electrode 114 for transmitting a signal to a pixel, a pixel electrode (not shown), and a drain electrode 115 for transmitting a charge to the pixel electrode are provided on the TFT substrate.

The aperture of a pixel is provided in a pixel aperture 111. A color filter (not shown) is provided in the pixel aperture 111. One pixel may correspond to one pixel aperture 111. Alternatively, one pixel may correspond to a plurality of pixel apertures 111. Conversely, a plurality of pixels may correspond to one pixel aperture 111. A non-pixel region 112 is provided around the pixel aperture 111. A typical non-pixel region 112 is made of a black light-blocking film.

FIG. 12 only shows a contour of a light blocking region 112 on the counter substrate, so that electrodes and the TFT 117 provided on the TFT substrate are viewed through the contour.

When a voltage is applied to the gate electrode 113, a charge applied to the source electrode 114 flows from the TFT 117 to the drain electrode 115 and then to the pixel electrode (not shown). A transparent electrode is provided via the liquid crystal layer on the counter substrate. The liquid crystal layer between the pixel electrode on the TFT substrate and the transparent electrode on the counter substrate is operated by an electric field caused by the charge.

The TFT liquid crystal panel is, for example, driven in the following way: a signal is output to the source electrode 114 and thereafter the gate electrode 113 is successively turned ON to write the signal to each pixel: or a signal is first transmitted to the gate electrode 113, which is thereby turned ON, and thereafter the signal is written via the source electrode 114 to each pixel. Using the gate electrodes 113, a plurality of TFTs 117 are successively turned ON in one field period. A time for which a voltage is actually applied to one gate electrode 113 is approximately equal to a time taken for scanning one field divided by the number of vertical scanning lines. For one source electrode 114, a voltage in applied for one horizontal scanning time. Therefore, the source electrode 114 has a longer time for which a voltage is applied thereto. An applied voltage to the source electrode 114 corresponds to a signal voltage. For example, in the case of the bend state, a voltage of 2.5 V to 6 V is applied to the source electrode 114 in the vicinity of each pixel for one field scanning time (display time).

In either case, for each pixel, a charging time taken for operating the liquid crystal layer is approximately equal to a time taken for scanning a field divided by the number of pixels in a panel (pixel display time). Therefore, a time taken for writing a signal to a pixel is considerably short compared to the one-pixel display time. It is necessary to retain a voltage applied to the liquid crystal for an amount of time during which the liquid crystal layer is operated even after the TFT is turned OFF. To this end, a storage capacitor 116 is provided on the TFT substrate so as to maintain a voltage applied to a pixel even after the TFT 117 is turned OFF.

As is different from the source electrode 114 and the gate electrode 113, the storage capacitor 116 is provided so as to retain an applied voltage until a next signal is written to the pixel. A voltage is applied to the storage capacitor 116 when a voltage is applied to the pixel. The liquid, crystal layer is operated for an amount of time during which a voltage is applied to the pixel electrode. In this period of time, a voltage is preferably applied to both a display region (active region) and a non-display region (nucleation region). Therefore, provision of the nucleation region of the present invention in the vicinity of the storage capacitor 116 is useful for obtaining the bend state.

Since a voltage is intermittently applied to the source electrode 114 and the gate electrode 113, it is preferable to provide nucleation regions in the vicinity of the source electrode 114 and the gate electrode 113. It is more preferable to provide a nucleation region in the vicinity of the storage capacitor 116 in addition to the source electrode 114 and the gate electrode 113.

Figure 13:
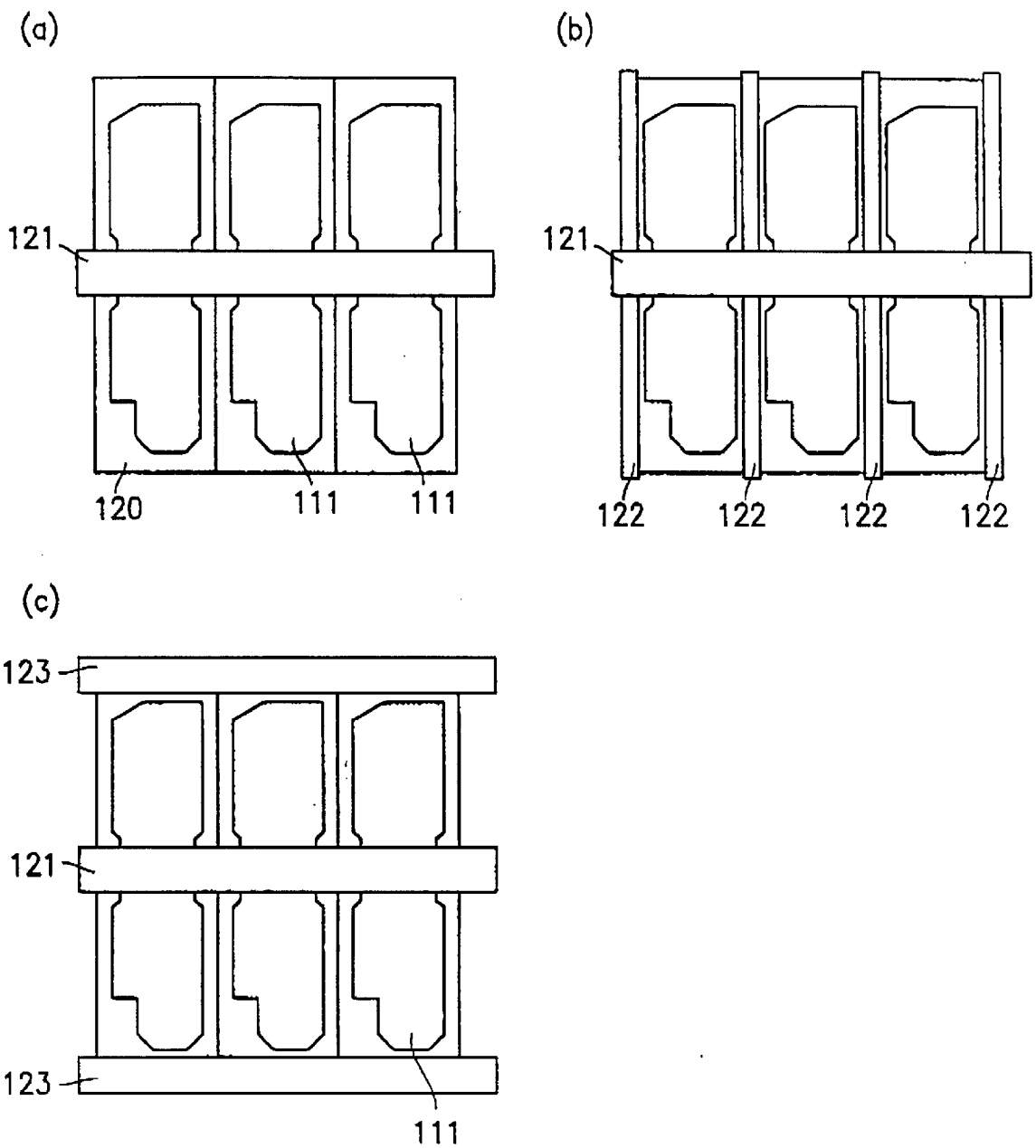
FIGS. 13A to 13C are schematic, top views used for explaining a nucleation region of the TFT liquid crystal panel of FIG. 12.

FIGS. 13A to 13C are top views schematically illustrating a nucleation region in the TFT liquid crystal panel. The nucleation region shown in FIGS. 13A to 13C will be described in comparison to that of FIG. 12.

FIG. 13A shows positional relationship among a pixel aperture 111, a light blocking portion 120 (black matrix) which is a non-display region, and a nucleation region 121 only provided in a region where the storage capacitor 116 is provided. As described above, the storage capacitor 116 effectively functions as the nucleation region 121. When sufficient regions are not provided and an entire pixel cannot be transitioned to the V-state, a nucleation region may therefore be provided in a region corresponding to the source electrode 114 or the gate electrode 113.

FIG. 13B shows a nucleation region 122 corresponding to a region where the source electrode 114 is provided, and a nucleation region 121 corresponding to a region where the storage capacitor 116 is provided.

FIG. 13C shows a nucleation region 123 corresponding to a region where the gate electrode 113 is provided, and a nucleation region 121 corresponding to a region where the storage capacitor 116 is provided.

As described above, a nucleation region can be provided in the vicinity of the gate electrode 113, the source electrode 114, or the storage capacitor 116, or any combination thereof.

Figure 14:
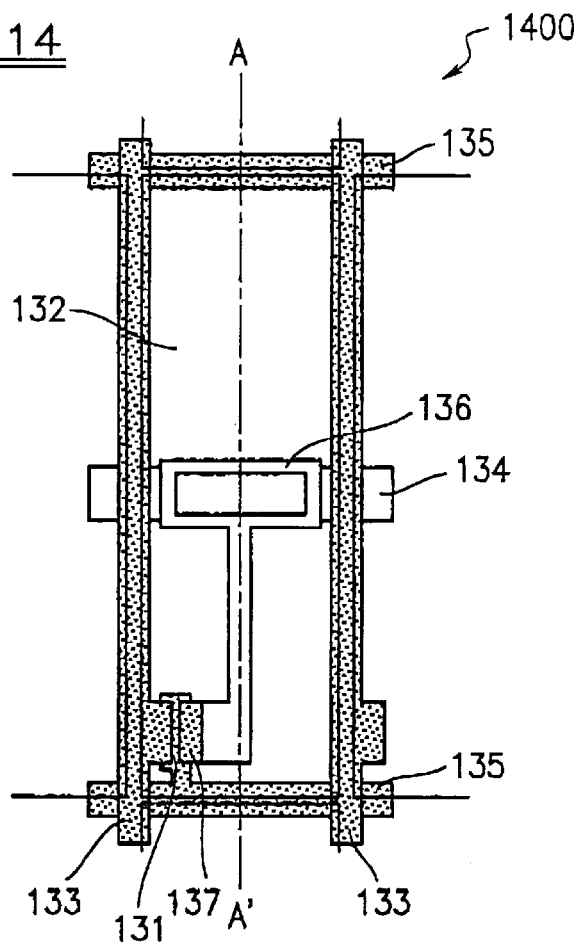
FIG. 14 is a top view of a high aperture ratio TFT liquid crystal panel 1400 according to the present invention.

FIG. 14 is a top view of a high aperture ratio TFT liquid crystal panel 1400 according to the present invention. The structure of the high aperture ratio TFT liquid crystal panel 1400 of FIG. 14 is similar to that described in Japanese Laid-open Publication No. 9-152625.

A pixel electrode 132 corresponding to a display portion of a pixel is surrounded by a source electrode 133 and a gate electrode 135. FIG. 14 shows only one pixel, although the high aperture ratio TFT liquid crystal panel 1400 includes a plurality of pixels. The pixel electrode 132 is a transparent electrode (e.g., made of indium tin oxide (ITO)). A TFT 131 is provided at the intersection between the source electrode 133 and the gate electrode 135. A storage capacitor 134 is provided across two source electrodes 133 between which the pixel electrode 132 is provided. The storage capacitor 134 supplements the capacitance of the pixel electrode 132. A transparent electrode 136 extends from the drain electrode 137 of the TFT 131 to the storage capacitor 134 on which the transparent electrode 136 contacts the pixel electrode 132.

Figure 15:
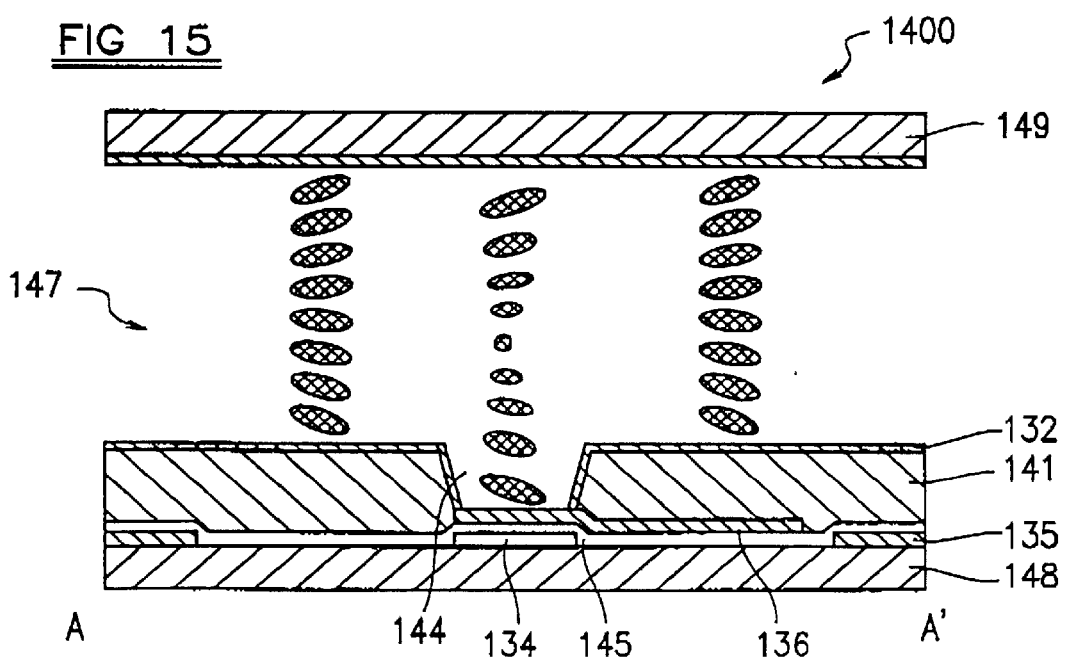
FIG. 15 is a cross-sectional view of the high aperture ratio TFT liquid crystal panel 1400, taken along line A—A' shown in FIG. 14.

FIG. 15 is a cross-sectional view of the high aperture ratio TFT liquid crystal panel 1400, taken along line A—A' in FIG. 14. A liquid crystal layer 147 is provided between a TFT substrate 148 and a counter substrate 149. A resin planarization layer 141 is provided so as to cover a source electrode 133 (FIG. 14) agate electrode 135, and a TFT 131 (FIG. 14). A pixel electrode 132 is provided on the resin planarization layer 141. A transparent electrode 136 connected to a drain electrode 137 (FIG. 14) produces an auxiliary capacitance via the storage capacitor 134 and an interlayer insulating film 145, and is connected at a contact hole 144 to the pixel electrode 132.

In such a structure, the resin planarization layer 141 is provided on the TFT 131 (FIG. 14), so that adjacent regions can be as close to each other as possible without taking into account the source electrode 133 and the gate electrode 135. Therefore, a high aperture ratio can be achieved.

In the thus-constructed high aperture ratio TFT liquid crystal panel 1400, a gap between a pixel electrode 132 and an adjacent pixel electrode 132 is as small as several microns or less. Therefore, a nucleation region cannot be provided between each pixel.

However, in this structure, the resin planarization layer 141 is removed from a region where the storage capacitor 134 contacts the pixel electrode 132, and the contact bole 144 is provided in that region. As shown in FIG. 15, the thickness of the liquid crystal layer 147 in the contact hole 144 is set in advance to a value which satisfies the d/p condition for a nucleation region. The storage capacitor 134 is a non-transmissive electrode made of a multilayer of Ta and Ti, or a multilayer of Ta, Ti, and Al, or the like. Therefore, the storage capacitor 134 blocks Light from going through the nucleation region provided in the contact hole 144. Thus, the nucleation region does not affect display. When a voltage is applied to the pixel electrode 132, a voltage is also applied to the storage capacitor 134. In this case, while the nucleation region is transitioned to the V-state, a region corresponding to the pixel electrode is transitioned from the H-state to the V-state.

A width of the storage capacitor 134 is typically designed to be several % to 20% of a longitudinal direction of a pixel (i.e., a direction parallel to the source electrode 133). In this case, a sufficient nucleation region is secured. As described above, even when a nucleation region is not provided between each pixel, a region at the storage capacitor 134 can be used as an effective nucleation region.

FIGS. 16A and 16B show an exemplary liquid crystal display device including a 180° twist region and a splay region in order to promote transition to the V-state. FIG. 16A shows that in the absence of an applied voltage, the liquid crystal molecules in an active region 210 are in the H-state and the liquid crystal molecules i a nucleation region 220 are in the 180° twist state. FIG. 16B shows a cross section of the active region 210.

In the liquid crystal display device of FIGS. 16A and 16B, a liquid crystal layer 205 is provided between an upper substrate 201a and a lower substrate 201b. A transparent electrode 202a is provided on the upper substrate 201a, and an alignment layer 203a is provided on the transparent electrode 202a. In the active region 210, a step material 204 is provided on the lower substrate 201b so that there is a difference $d_1$ in level between the active region 210 and the nucleation region 220. A transparent electrode 202b is provided so as to cover the step material 204 over the active region 210 and the nucleation region 220. An alignment film 203b is provided on the transparent electrode 202b. In this case, a thickness of a liquid crystal layer 205 is $d_2$, and a width of the nucleation region 202 is W.

As shown in FIG. 168, the alignment film 203a on the upper substrate 201a and the alignment film 203b on the lower substrate 201b are subjected to an alignment treatment so that the alignment films 203a and 203b have tilt angles $\theta_1$ and $\theta_2$, respectively. The alignment treatment may be conducted by rubbing, irradiation of ultraviolet light, oblique deposition such as SiO, or the like. In this case, as an example, rubbing is conducted in a direction indicated by arrows in FIG. 16B. Maintaining the tilt angles $\theta_1$ and $\theta_2$ with respect to the respective alignment films 203a and 203b is important, and a direction of alignment can be arbitrarily selected. A tilt angle of the liquid crystal layer 205 an the active region 210 may be substantially equal to a tilt angle of the liquid crystal layer 205 in the nucleation region 220, each tilt angle being determined depending on the upper substrate 201a (or the alignment film 203a) and the liquid crystal layer 205. Similarly, a tilt angle of the liquid crystal layer 205 in the active region 210 may be substantially equal to a tilt angle of the liquid crystal layer 205 in the nucleation region 220, each tilt angle being determined depending on the lower substrate 201b (or the alignment film 203b) and the liquid crystal layer 205. When at least one of the above two cases is satisfied, the entire upper and/or lower substrates 201a, 201b may be subjected to the same alignment treatment, thereby reducing the cost of manufacturing.

When a voltage is applied to the liquid crystal display device, the active region 210 is transitioned from a splay state (H-state) to a bend state (V-state), starting from a region thereof which is adjacent to the nucleation region 220 in the 180° twist state. The active region 210 used as a display region needs to be transitioned to the bend state in the presence of an applied voltage. Therefore, a high speed of the transition is preferred.

As shown in FIG. 16B, the doped chiral concentration of the liquid crystal material, a thickness $d_2$ of the liquid crystal layer 205, and the level difference $d_1$ play key roles in the coexistence of the 180° twist state and the H-state in an initial alignment. As described above, $(d_1+d_2)/p>0.25$ in the 180° twist state region and $d_2/p<0.25$ in the splay state region need to be satisfied where p is a native pitch of a liquid crystal material after chiral doping. The inventors studied the coexistence of the 180° twist state and the H-state where CN (Cholesteryl Nonahoate) as a chiral material and a fluorine-based liquid crystal ZLI-4792 are used.

Figures 17, 18:
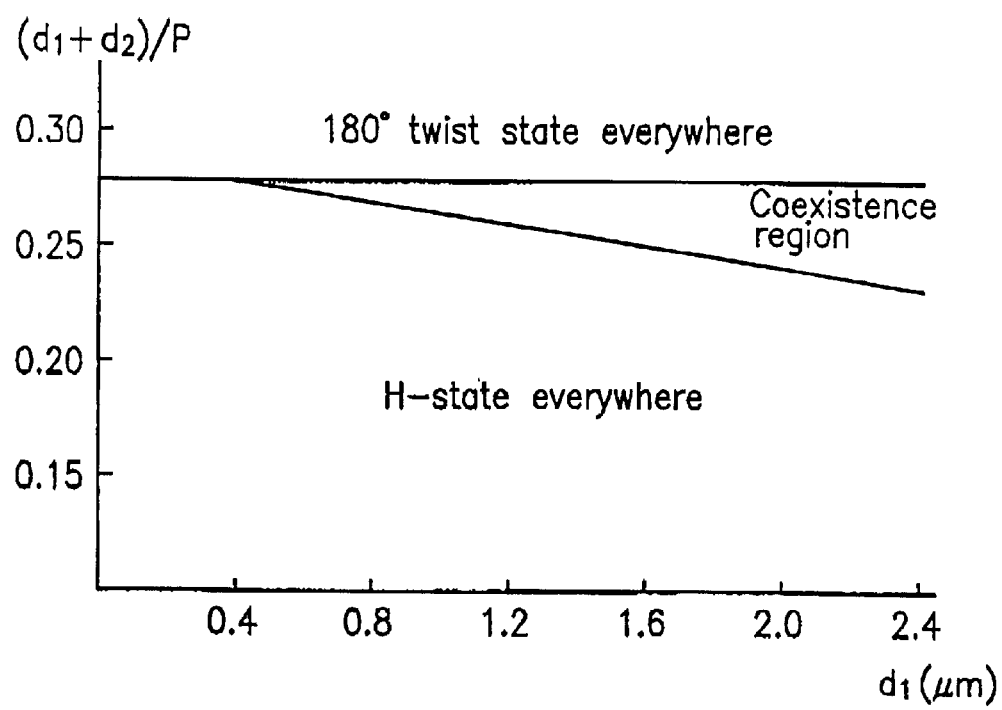
FIG. 17 is a graph showing a change in a coexistence region with respect to a level difference $d_1$, and $(d_1+d_2)/p$ when a tilt angle is small.
FIG. 18 is a table showing a relationship between a twist region width and a coexistence state of a splay region and a 180° twist region.

FIG. 17 is a graph showing a change in a coexistence region with respect to the level difference $d_1$ and the relationship $(d_1+d_2)/p$. In this case, the tilt angle of the alignment film is about 4°. $(d_1+d_2)/p$ can be modified by adjusting the chiral concentration. As shown in FIG. 17, a certain level difference $d_1$ is required for stable coexistence of the H-state and the 180° twist state. It is preferable to minimize the level difference $d_1$ for the purpose of facilitation of manufacture. When the chiral concentration is high, if the liquid crystal display device has a normally white mode, the transmission in the white state is low. To obtain satisfactory voltage-transmission characteristics, a low chiral concentration is preferable. Taking the foregoing into account, $(d_1+d_2)/p$ is preferably 0.25 or more and 0.75 or less, and the level difference $d_1$ is preferably 0.4 $\mu$m or more. More preferably, $(d_1+d_2)/p$ is about 0.28, and the level difference $d_1$ is about 1.6 $\mu$m.

Figure 22:
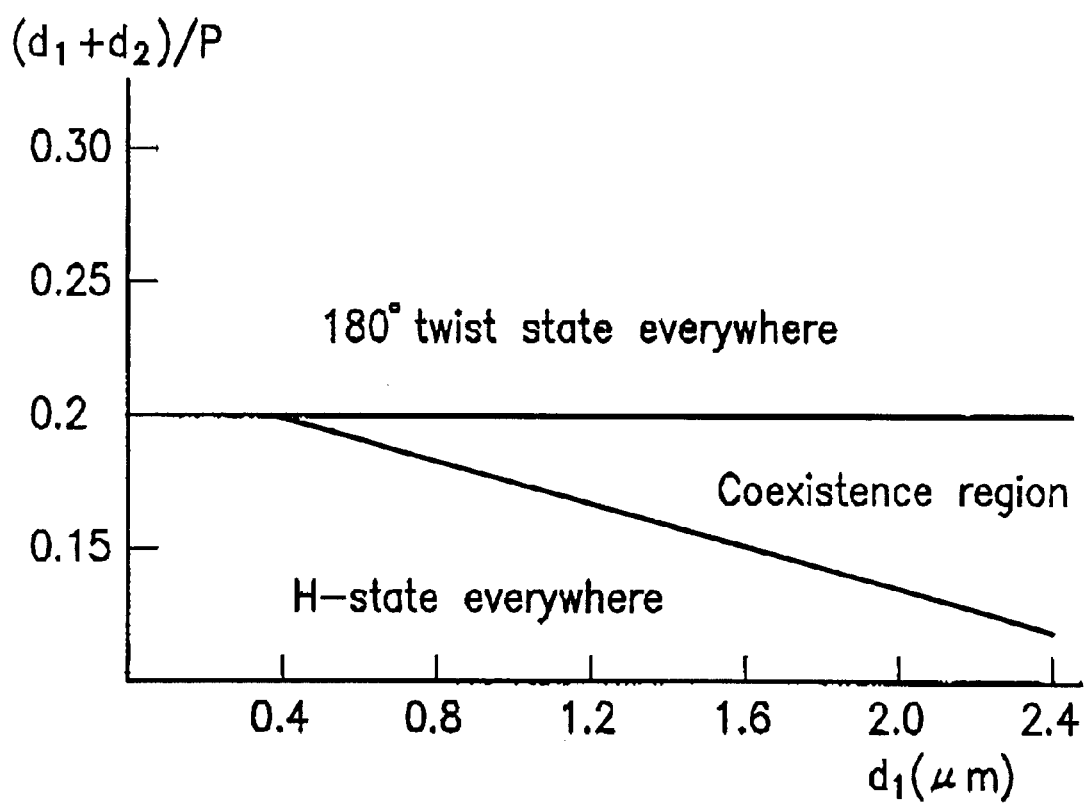
FIG. 22 is a graph showing a change in a coexistence region with respect to a level difference $d_1$, and $(d_1+d_2)/p$ when a tilt angle is large.

When the tilt angles $\theta_1$ and $\theta_2$ are large, as shown in FIG. 22, even if $(d_1+d_2)/p<0.25$ is satisfied, there is a range where the 180° twist state and the H-state can coexist. In this case, however, stable tilt angles are selected.

Further, the coexistence of the 180° twist state and the H-state is dependent on the magnitude of the width W shown in FIG. 16A. Specifically, when the width W of a region in the 180° twist state is small, even if $(d_1+d_2)/p$ is 0.25 or more and 0.75 or lees, and the level difference $d_1$ is 0.4 $\mu$m or more, the 180° twist state and the H-state might not coexist. FIG. 18 shows the presence or absence of coexistence depending on the value of the width W where $(d_1+d_2)/p=0.28$ and $d_1=1.6$ $\mu$m. As a result, the coexistence requires a Width W of 10 $\mu$m or more, more preferably about 20 $\mu$m or more.

When the present invention is applied to a transmissive liquid crystal display device, the region in the 180° twist state (i.e., the nucleation region) is blocked so as not to pass light, which promotes the transition to the V-state. The nucleation region is thus not used as a display region. The liquid crystal layer has different thicknesses between the active region and the nucleation region, which have therefore different levels of retardation. Thus, the region in the 180° twist state (i.e., the nucleation region) is rendered to be a non-display region. However, both regions in the bend state and the 180° twist state can be used as display regions. The proportion of the 180° twist state region in the display region is arbitrarily determined. An exemplary transmissive and reflective type liquid crystal display panel according to the present invention will now be described.

Figure 19:
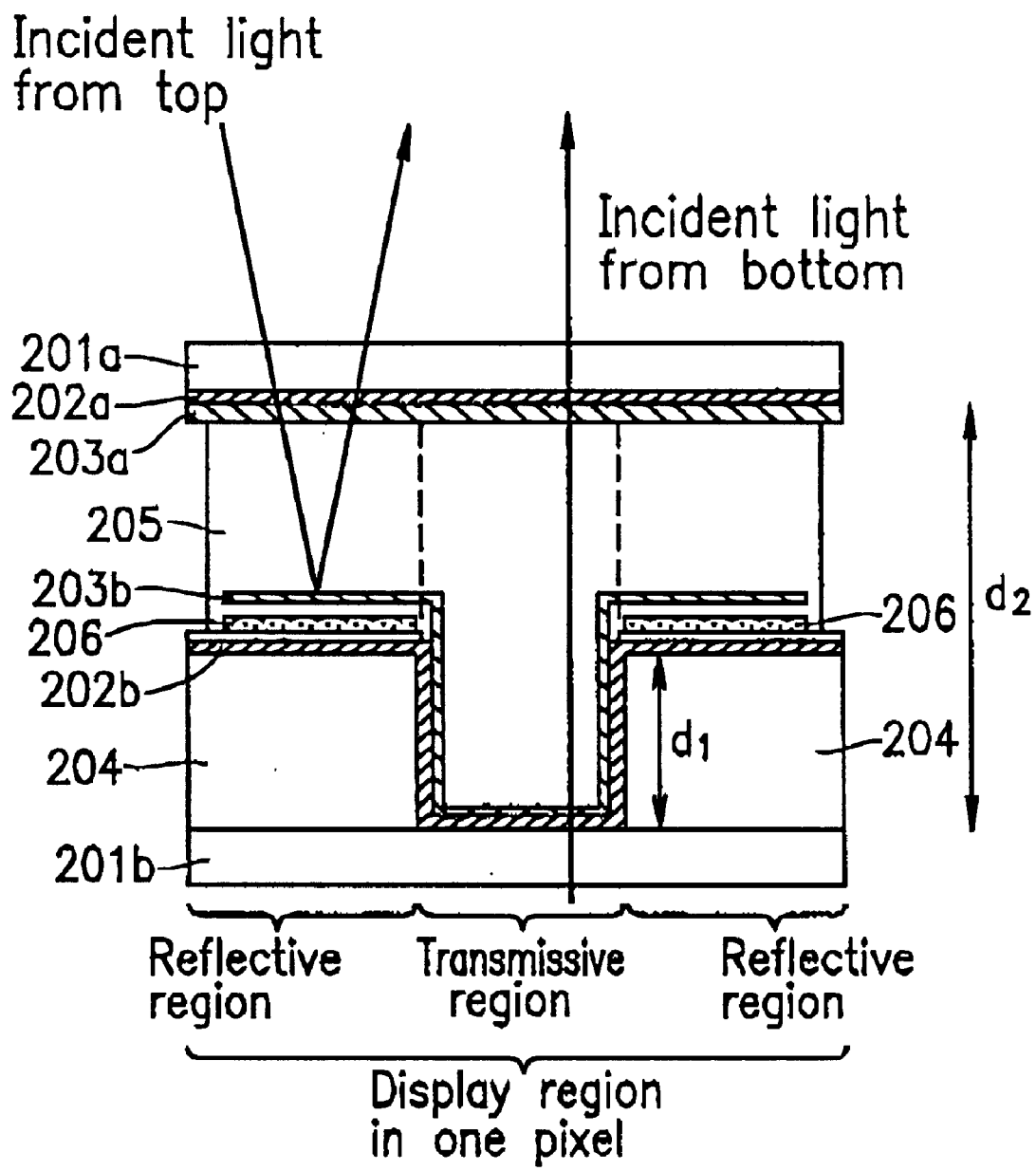
FIG. 19 shows a structure in which a reflective display region and a transmissive display region are provided in one pixel in a transmissive and reflective liquid crystal display device.

In a proposed transmissive and reflective type liquid crystal display panel, a reflective display region and a transmissive display region are provided in one pixel. Such a panel is shown in FIG. 19. In the panel of FIG. 19, a liquid crystal layer 205 includes regions having different thicknesses in one pixel. The different thicknesses are caused by a step (e.g., a via hole). A reflective electrode 206 in provided on a region having a smaller thickness, where this region is a reflective region. A region having a greater thickness is a transmissive region. With this structure, when the environment is dark, backlighting is used to allow the device to function as a transmissive liquid crystal display device. Conversely, when the environment is bright, the device can display without backlighting and functions as a reflective liquid crystal display device.

Figure 20:
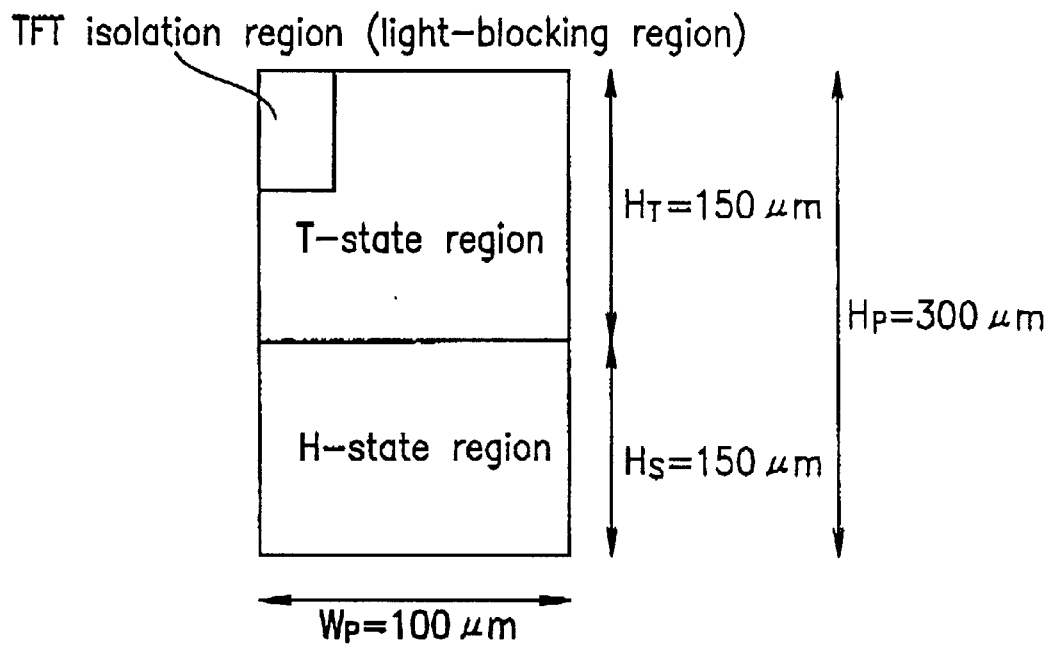
FIG. 20 is a schematic, top view showing a 180° twist region and a splay region in a certain cell.

FIG. 20 is a top view of the device of this example where the greater thickness $d_2$ of the liquid crystal layer is 6 $\mu$m and the level difference $d_1$ is 3 μm. In one experiment, each pixel had a length $H_P$=300 μm and a width $W_P$=100 μm, and the 180° twist state (T-state) region had a length $H_T$=150 μm and the H-state region had a length $H_S$=150 μm. In this case, the device had satisfactory display characteristics. Note that the size of a pixel and the size of a level difference are arbitrarily selected if the above-described conditions are satisfied.

Next, a transmissive liquid crystal display device, in which both the 180° twist state region and the H-state region are used as display regions, will be described. In this case, the retardation of the liquid crystal layer is modified by adjusting the thickness of the liquid crystal layer as described above. In a birefringence mode where a bend state is used for display, when a black state is displayed in the presence of an applied voltage, an optical compensation plate is used in which a maximum voltage is applied to display a black state. In other words, black display is performed using a retarder which has a retardation that offsets the retardation of the liquid crystal in the presence of a maximum applied voltage.

However, in such a mode, when both an applied voltage is more than an optimal voltage for the black display and an applied voltage is less than the optimal voltage, contrast is lowered. In general, a voltage range in which a desired contrast or more is obtained is called a margin (dark voltage allowable width) for black display. Typically, such a birefringence mode has a narrow margin.

Figure 21:
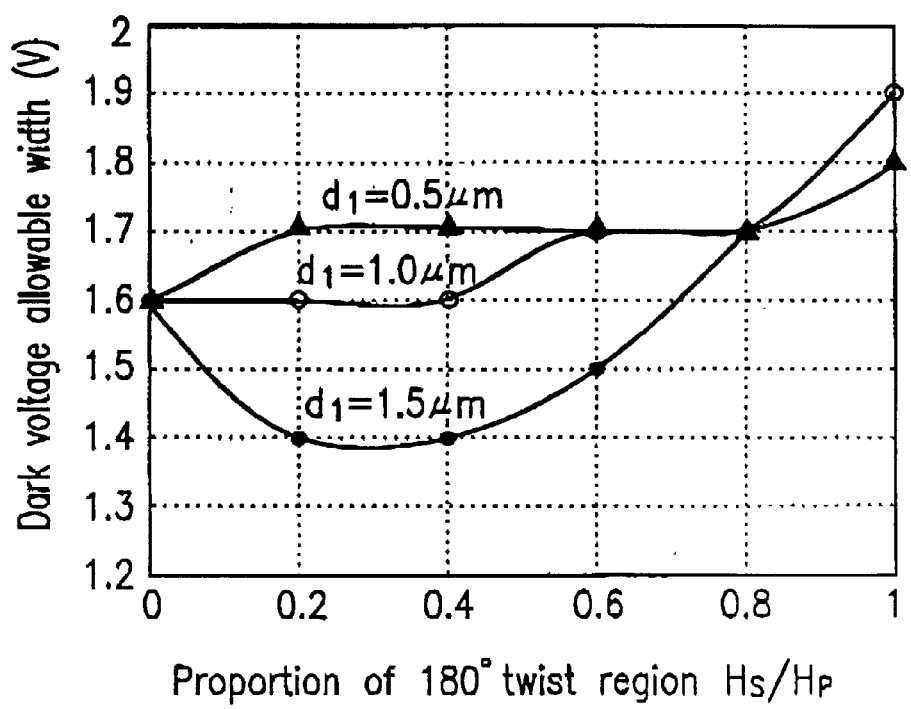
FIG. 21 is a graph showing the proportion of a 180° twist region and a voltage allowable width of dark display where a contrast is 200:1.

In this situation, if the 180° twist state region and the H-state region coexists, the margin can be made greater. FIG. 20 is the top view schematically illustrating the 180° twist state region and the H-state region in a pixel. In FIG. 20, $H_S/H_P$ is the proportion of the 180° twist state region to the pixel. FIG. 21 is a graph showing a dark voltage margin which satisfies a contrast of 200:1 or more and the proportion $H_S/H_P$ of the 180° twist state region to the pixel.

The dark voltage margin is dependent on the level difference $d_1$. The dark voltage margin can be enlarged by about 0.1 V when $d_1$=1.0 μm and $H_S/H_P$ is 50% or when $d_1$=0.5 μm and $H_S/H_P$ is 20% or more.

Therefore, the dark voltage margin can be increased while the 180° twist state region and the H-state region coexist. Thus, even it the 180° twist state region is provided in a display region, a change in contrast due to variations in applied voltage can be suppressed. Further, the step can be provided so as not to change the dark voltage margin only in the H-state so that a T-state region is produced. Therefore, both regions can be used as display regions.

The liquid crystal display device of the present invention includes a liquid crystal layer of a chiral liquid crystal material disposed between first and second substrates. The active region of the liquid crystal layer has a thickness-to-pitch ratio $(d/p)_A$. The liquid crystal layer also includes a nucleation region having a thickness-to-pitch ratio $(d/p)_N$ rather than $(d/p)_A$. Due to the difference in a thickness-to-pitch ratio between the active region and the nucleation region, a stable state of the liquid crystal in the active region in the presence of a zero or low applied voltage is different from a stable state of the nucleation region.

In one embodiment of the present invention, the thickness-to-pitch ratio is greater in the nucleation region than in the active region. This embodiment is achieved by a reflective liquid crystal display device in which a via hole is provided as a nucleation region.

The liquid crystal display device of the present invention can be operated without a high level of applied voltage.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising: a layer of a chiral liquid crystal material disposed between first and second substrates; and means for applying a voltage across the liquid crystal layer;

wherein a first region of the liquid crystal layer is an active region for display and a second region of the liquid crystal layer is a nucleation region for generating a desired liquid crystal state in the first region when a voltage is applied across the liquid crystal layer, wherein the ratio of the thickness d of the liquid crystal layer to the pitch p of the liquid crystal material has a first value $(d/p)_A$ in the first region of the liquid crystal layer and has a second value $(d/p)_N$ different from the first value in the second region of the liquid crystal layer, and wherein the value $(d/p)_N$ of the ratio of the thickness d of the liquid crystal layer to the pitch p of the liquid crystal material in the second region of the liquid crystal layer is selected such that, when no voltage is applied across the liquid crystal layer, the liquid crystal state stable in the second region of the liquid crystal layer is topologically equivalent to the desired liquid crystal state, and wherein the values of the ratio of the thickness d of the liquid crystal layer to the pitch p of the liquid crystal material in the first and second regions of the liquid crystal layer are selected such that, when no voltage is applied across the liquid crystal layer, a first liquid crystal state having a first twist angle is stable in the first region of the liquid crystal layer, and a second liquid crystal state having a second twist angle different from the first twist angle is stable in the second region of the liquid crystal layer, after repeated applications of voltage.

2. A liquid crystal display device as claimed in claim 1, wherein the first twist angle is different by 180° from the second twist angle.

3. A liquid crystal display device as claimed in claim 1, wherein the value $(d/p)_N$ of the ratio of the thickness d of the liquid crystal layer to the pitch p of the liquid crystal material in the second liquid crystal region is greater than the value $(d/P)_A$ of the ratio of the thickness d of the liquid crystal layer to the pitch p of the liquid crystal material in the first liquid crystal region.

4. A device as claimed in claim 2, wherein the value $(d/p)_N$ of the ratio of the thickness d of the liquid crystal layer to the pitch p of the liquid crystal material in the second liquid crystal region is greater than the value $(d/p)_A$ of the ratio of the thickness d of the liquid crystal layer to the pitch p of the liquid crystal material in the first liquid crystal region, and wherein the first liquid crystal state is a 0° twist state and the second liquid crystal state is a 180° twist state.

5. A device as claimed in claim 4, wherein the 0° twist state is an H-state.

6. A liquid crystal display device as claimed in claim 3, wherein an alignment direction on the first substrate is parallel to an alignment direction on the second substrate, and the values of the ratio of the thickness d of the liquid crystal layer to the pitch p of the liquid crystal material in the first and second regions of the liquid crystal layer are selected such that $(d/p)_A < 0.25$ and $0.25 \leq (d/p)_N 0.75$.

7. A liquid crystal display device as claimed in claim 6, wherein the ratio of the thickness d of the liquid crystal layer to the pitch p of the liquid crystal material in the first region of the liquid crystal layer satisfies $(d/p)_A < 0.125$.

8. A liquid crystal display device as claimed in claim 7, wherein the ratio of the thickness d of the liquid crystal layer to the pitch p of the liquid crystal material in the first region of the liquid crystal layer satisfies $(d/p)_A < 0.1$.

9. A device as claimed in claim 1, wherein the device is a surface mode liquid crystal display device.

10. A device as claimed in claim 9, wherein the device is a pi-cell.

11. A device as claimed in claim 10, wherein the desired liquid crystal state in the active region is a V-state.

12. A device as claimed in claim 1, wherein the device is a reflective liquid crystal display device.

13. A device as claimed in claim 12, wherein the second liquid crystal layer region is disposed at a via-hole.

14. A device as claimed in claim 1, wherein the device is a transmissive and reflective liquid crystal display device.

15. A device as claimed in claim 14, wherein the second region is provided in a transmissive region in the transmissive and reflective liquid crystal display device.

16. A device as claimed in claim 14, wherein the nucleation region and the active region are provided in a display region in the transmissive and reflective liquid crystal display device.

17. A device as claimed in claim 1, wherein the twist of the liquid crystal layer in the second region of the liquid crystal layer is non-zero and is opposite to the natural twist of the liquid crystal molecules, and the value $(d/p)_N$ of the ratio of the thickness d of the liquid crystal layer to the pitch p of the liquid crystal material in the second region of the liquid crystal layer is smaller than the value $(d/P)_A$ of the ratio of the thickness d of the liquid crystal layer to the pitch p of the liquid crystal molecules in the first region of the liquid crystal layer.

18. A device as claimed in claim 17, wherein an alignment direction on the first substrate is at an angle $\phi$ to an alignment direction on the second substrate, and the values of the ratio of the thickness d of the liquid crystal layer to the pitch p of the liquid crystal molecules in the first and second regions of the liquid crystal layer are selected such that:

$$\left(\frac{d}{p}\right)_A \leq \frac{\phi}{2\pi} - \frac{1}{4}; \text{ and } \left(\frac{d}{p}\right)_N > \frac{\phi}{2\pi} - \frac{1}{4}$$

19. A device as claimed in claim 1, wherein the pitch $p_A$ of the liquid crystal material in the first liquid crystal layer region is not equal to the pitch $p_N$ of the liquid crystal material in the second region of the liquid crystal layer.

20. A device as claimed in claim 1, wherein the thickness $d_A$ of the liquid crystal layer in the first region of the liquid crystal layer is not equal to the thickness $d_N$ of the liquid crystal layer in the second region of the liquid crystal layer.

21. A liquid crystal display device as claimed in claim 1, wherein the voltage applying means is arranged to apply the voltage across the first and second regions.

22. A liquid crystal display device as claimed in claim 21, wherein the first region surrounds the second region.

23. A liquid crystal display device as claimed in claim 1, wherein the voltage applying means is arranged not to apply the voltage across the second region.

24. A liquid crystal display device as claimed in claim 23, wherein the second region is disposed in an inter-pixel gap.

25. A liquid crystal display device as claimed in claim 1, wherein a voltage is applied to the nucleation region for substantially the same amount of time as an amount of time during which a voltage is applied to a display region of the liquid crystal display device.

26. A liquid crystal display device as claimed in claim 1, further comprising an auxiliary capacitance electrode, wherein the nucleation region is provided in the vicinity of the auxiliary capacitance electrode.

27. A liquid crystal display device comprising: a liquid crystal layer disposed between first and second substrates; and means for applying a voltage across the liquid crystal layer, wherein the liquid crystal layer includes a first region having a first thickness, and a second region adjacent to the first region having a second thickness, a first state of the liquid crystal layer in the first region and a second state of the liquid crystal layer in the second region coexist under a predetermined condition, the first state is topologically different from the second state, and the values of the ratio of the thickness d of the liquid crystal layer to the pitch p of the liquid crystal material in the first and second regions of the liquid crystal layer are selected such that, when no voltage is applied across the liquid crystal layer, a first liquid crystal state having a first twist angle is stable in the first region of the liquid crystal layer, and a second liquid crystal state having a second twist angle different from the first twist angle is stable in the second region of the liquid crystal layer, after repeated applications of voltage.

28. A liquid crystal display device as claimed in claim 27, wherein the predetermined condition is the absence of an applied voltage across the liquid crystal layer.

29. A liquid crystal display device as claimed in claim 27, wherein the first state is the H-state and the second state is a T-state.

30. A liquid crystal display device as claimed in claim 27, wherein a tilt angle of the liquid crystal layer is defined by the liquid crystal layer and the first substrate, and wherein a tilt angle of the liquid crystal layer in the first region is substantially equal to a tilt angle of the liquid crystal layer in the second region.

31. A liquid crystal display device as claimed in claim 27, wherein the first state and the second state are the V-states in the presence of an applied voltage across the liquid crystal layer.

* * * * *